United States Patent [19]

Faber

[11] 4,064,486
[45] Dec. 20, 1977

[54] DATA COMMUNICATIONS LOOP SYNCHRONIZER

[75] Inventor: Ulbe Faber, Honeybrook, Pa.

[73] Assignee: Burroughs Corporation, Detroit, Mich.

[21] Appl. No.: 581,937

[22] Filed: May 29, 1975

[51] Int. Cl.² .......................................... H04Q 11/00
[52] U.S. Cl. ......................... 340/147 SY; 179/15 AL
[58] Field of Search ..................... 445/1; 340/147 SY; 179/15 AL; 340/147 R

[56] References Cited

U.S. PATENT DOCUMENTS

| | | | |
|---|---|---|---|
| 3,639,694 | 2/1972 | Deutsch | 445/1 |
| 3,680,056 | 7/1972 | Kropfl | 340/172.5 |

Primary Examiner—Harold I. Pitts
Attorney, Agent, or Firm—Edward J. Feeney, Jr.; Edmund M. Chung

[57] ABSTRACT

A loop controller for a data communication network system formed by interconnecting a group of heterogeneous computers, batch terminals and conversational terminals in a ring or loop configuration. Each computer or terminal is connected to the communication network via a communications processor and an interface unit termed a node. The communications processor is responsible for network protocol and activities as well as for interfacing devices to the network. The node provides the only connection to the ring or loop and derives the clock for the communications processor as well as the node itself from the transmitted data. The logocontroller combines timing signals and information signals and forms a sequential stream of alternating control and data characters, each character being n-bits in length. This stream is then placed on the loop for serial transmission to the individual nodes connected to the loop. Signals received by the loop controller are synchronized for retransmission back to the loop.

3 Claims, 22 Drawing Figures

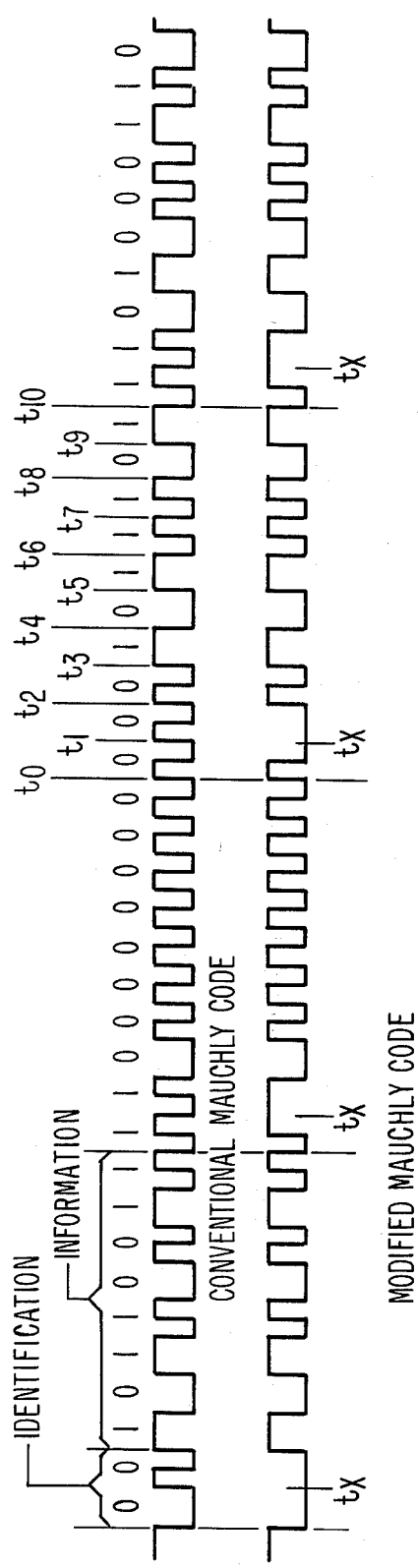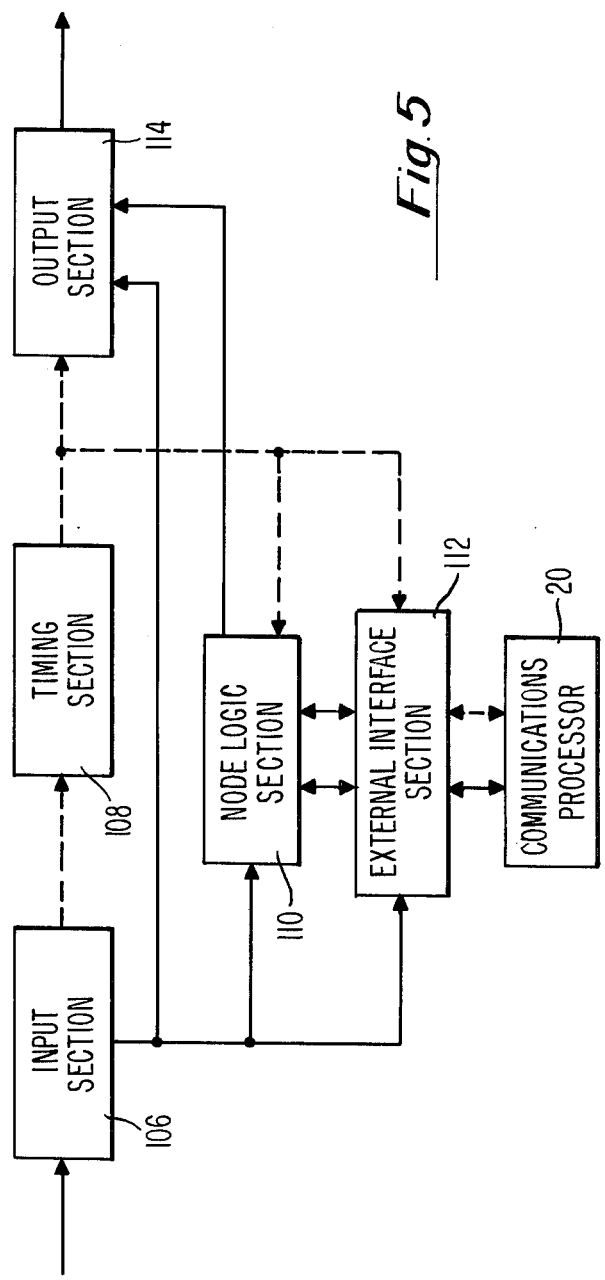

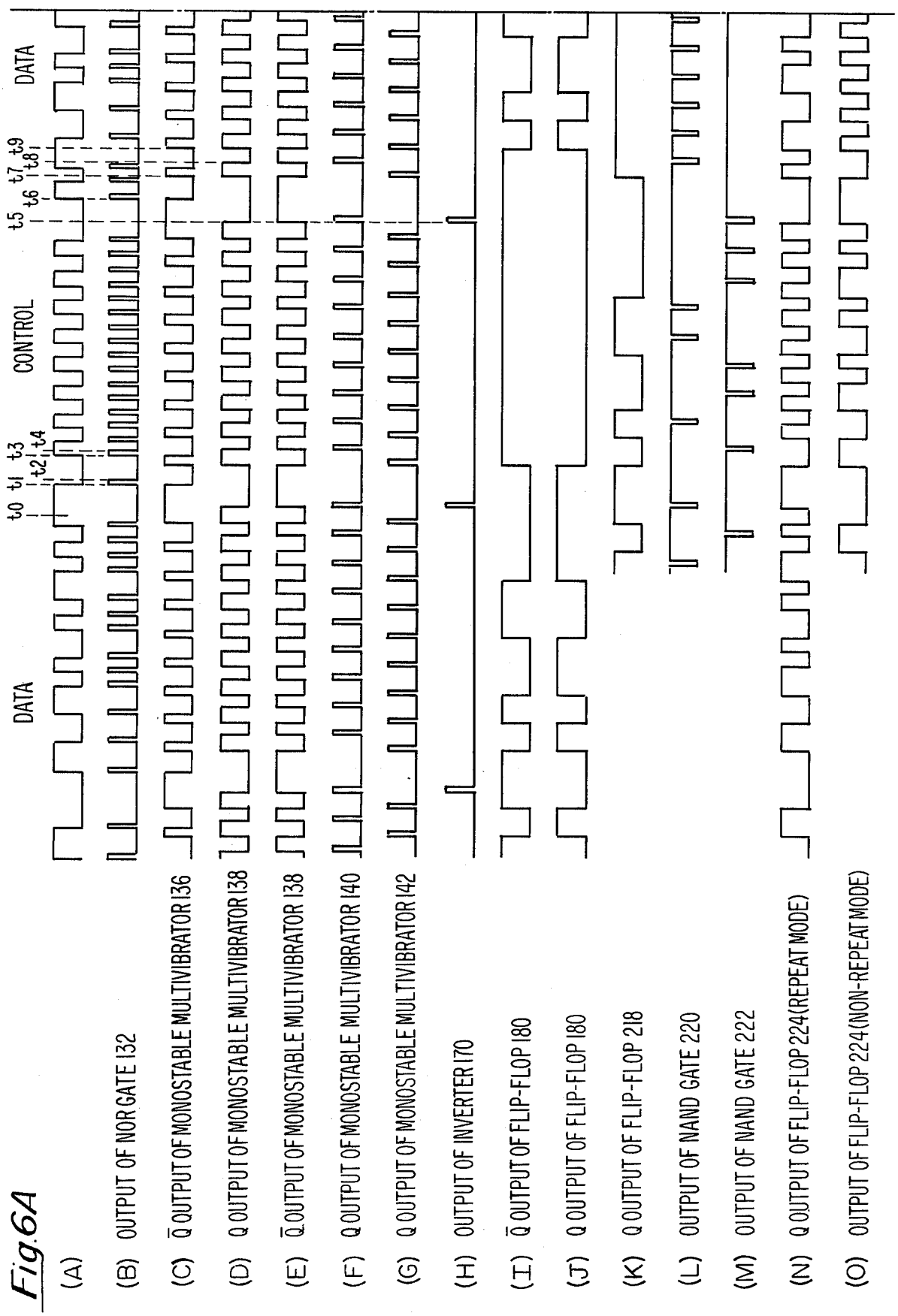

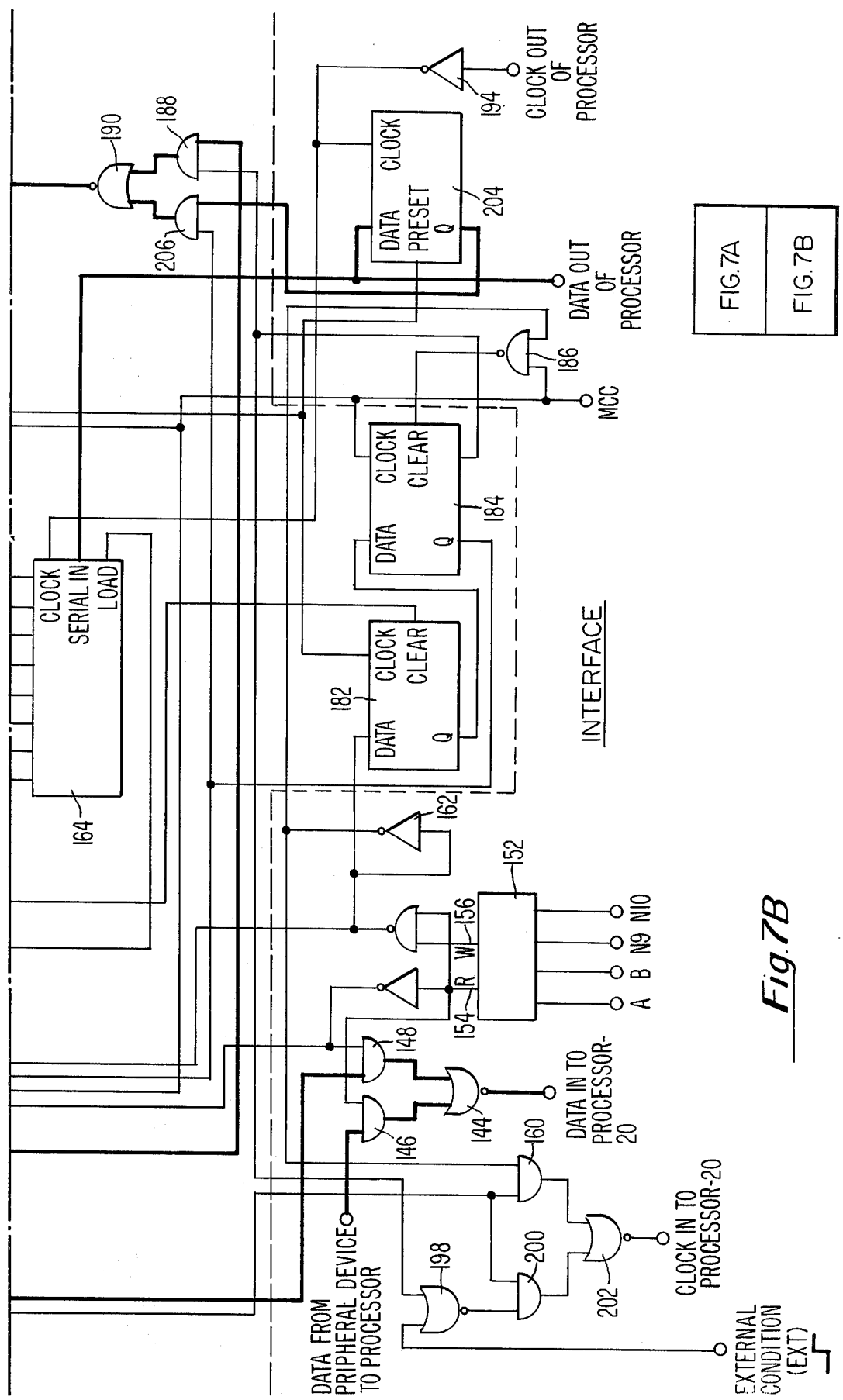

| CLOCK | DATA | Q | $\bar{Q}$ |
|---|---|---|---|
| ↑ | H | H | L |
| ↑ | L | L | H |
| L | X | $Q_0$ | $\bar{Q}_0$ |

X = IRRELAVANT
$Q_0$ = THE LEVEL OF Q BEFORE INDICATED CONDITIONS WERE ESTABISHED

| CLEAR | CLOCK | DATA | Q | $\bar{Q}$ |
|---|---|---|---|---|
| H | X | X | H | L |
| L | X | X | L | H |
| H | ↑ | H | H | L |
| H | ↑ | L | L | H |
| H | L | X | $Q_0$ | $\bar{Q}_0$ |

| PRESET | CLOCK | DATA | Q | $\bar{Q}$ |
|---|---|---|---|---|
| L | X | X | H | L |
| H | X | X | L | X |
| H | ↑ | H | H | L |
| H | ↑ | L | L | H |
| H | L | X | $Q_0$ | $\bar{Q}_0$ |

| PRESET | CLEAR | CLOCK | DATA | Q | Q̄ |
|--------|-------|-------|------|-----|-----|
| L | H | X | X | H | L |
| H | L | X | X | L | H |
| L | L | X | X | H* | H* |
| H | H | ↑ | H | H | L |
| H | H | ↑ | L | L | H |
| H | H | L | X | Q̄₀ | Q̄₀ |

☆-UNSTABLE CONDITION-WILL REVERT BACK TO PREVIOUS CONDITION WHEN PRESET AND CLEAR SIGNALS ARE REMOVED.

DATA COMMUNICATIONS LOOP SYNCHRONIZER

BACKGROUND OF THE INVENTION

This invention relates to a communications network for general purpose data communications in a heterogeneous environment.

Recently, there has been a trend interconnecting a large, heterogeneous group of computers, batch terminals, and conversational terminals to form a general purpose network of computing recources. For instance, the computing resources of many governmental agencies and universities consist of a large variety of computers supporting a diverse user population with many different applications. Increasingly, these applications have come to require the resources of more then one computer. This has resulted in the direct point-to-point connection of rather large subsets of computers. As this type of network continues to grow, however, the communications plant must expand exponentially and the manpower required to modify existing computer operating systems to resolve differences in character sets and protocol becomes prohibitive.

In addition, data bases have become distributed resulting in enormous quantities of magnetic tape being hand-carried between machines where no point-to-point connections exist. The bandwidth of a cart full of tapes is impressive until one considers the amount of useful data on each tape in contrast to the time it takes to pull these tapes together and then disperse them.

Moreover, there is a growing use of terminals for remote job entry and interactive processing poses additional problems. Often several terminals sit side by side when one would be sufficient. Unfortunately, each has been designed or programmed for only one manufacturer's computer. A similar situation occurs when the computers are the same, but no mechanism exists for switching a terminal between them.

In the prior art, attempts to connect more than two processors together for communications to form a computer system have met with considerable difficulty because of the large number of physical connections required. In addition, the drawbacks with regards to the timing problems involved in keeping the various processors from interfering with one another were considerable. As a partial solution, serial loop communications were developed where a single cable is utilized to connect a plurality of processors, terminal devices such as storage units and input/output devices in series to minimize the physical connecting hardware. It is common practice in these serial communications loop to utilize fixed length time slots. Each processor or terminal is provided with a permanently assigned slot. This assigned slot is used to send information from a central control or station to the processor or terminal. Similarly, the assigned slot is used to transmit data to the central station. The disadvantage with the assigned slot technique is illustrated when a terminal is in the process of receiving data and has no data to send. The transmission capacity represented by the empty slot cannot be used by other terminals subsequent to the receiving terminal since the slots are preassigned. Other techniques have been developed to obviate the disadvantages associated with the fixed or assigned slot technique, however, each still requires the services of a central station for controlling the flow of time slots around the transmissions loop. This central station generates the appropriate address information and manages the assignment of time slots as they circulate around the communications loop. Although there is no longer a dedicated time slot for each terminal or processor, communications between any two processors or terminals is still under the control of this central station.

Therefore, it is a primary object of this invention to provide an improved serial communications loop.

Another object of the present invention is to provide an improved digital transmission facility for communications in a heterogeneous environment.

A further object of this invention is to provide a communications system in which information limited slots are dedicated and undedicated upon demand.

A still further object of this invention is to provide a communications system in which communications is controlled only by the respective parties to the communication.

A still further object of the present invention is to provide an improved digital transmission facility which is transparent to the users of the system.

SUMMARY OF THE INVENTION

The present invention provides a communications system, the basic building block of which is a loop or a ring. Each processor or terminal connected to the loop is connected via an interface or nodal unit, which, in turn, is under the control of a communications processor. All information transmitted on a loop appears as n-bit characters. In each communication, there is always a control character for address information and a data character for data information. The apparatus of the present invention provides initially a stream of undedicated characters for initiating the communications loop. As the undedicated characters are dedicated on demand by the various processors or terminals connected to the loop, the apparatus of the present invention synchronizes the flow of these dedicated and undedicated characters around the loop. In addition, the apparatus of the present invention provides a format for the control and data characters from which the nodal units connected to the loop may derive clock information as well as distinguish the characterization of the characters circulating around the ring.

BRIEF DESCRIPTION OF THE DRAWINGS

FIG. 4 shows signal waveforms for illustrating the signal format according to the present invention;

FIG. 5 is a functional block diagram of a node used in the communications system of the present invention;

FIGS. 6A and 6B, show signal waveforms for illustrating the operation of the node of FIG. 5;

FIG. 7, which comprises FIGS. 7A and 7B is a detailed logic diagram of the node of FIG. 5;

Figure 1:
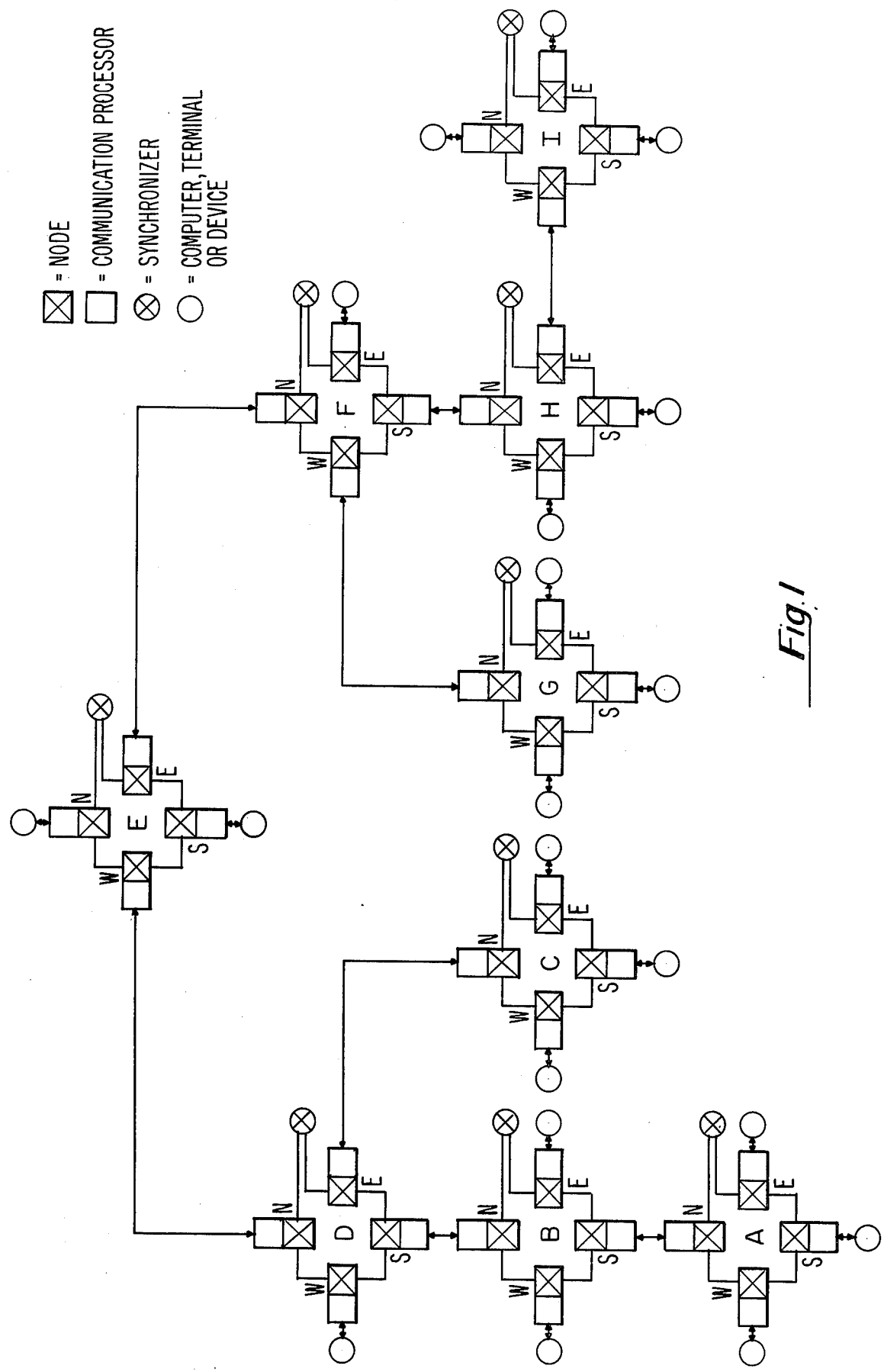
FIG. 1 is a schematic diagram illustrating a communications system according to the present invention.

A representative communications network employing the concept of the present invention is depicted in FIG. 1. The communications network of FIG. 1 is a four stage hierarchy of rings or loops. The basic structure, however, is the single ring or loop. A variety of network structures other than that which is shown in FIG. 1, can be formed using the basic loop. The network of FIG. 1 is merely illustrative of one such structure. To interface with a loop 100, a node 102 and a communications processor 20 are required. A device 10 or processor 12 is connected to the communications processor 20. Only the node 102 has actual physical contact with the loop 100. The communications processor 20 interfaces between the node 102 and a device 10 or processor 12. As will be seen, the communications processor 20 sees only data which it originates or is destined for it and not all the messages passing along the loop 100. To illustrate the operation of the communications network of FIG. 1, assume that each ring 100 includes four nodes, identified as NORTH, EAST, SOUTH, WEST. Suppose a processor 12 attached to node WEST of ring A wishes to communicate with a device 10 attached to node NORTH of ring I. To accomplish this communication, the communications processor 20 attached to the node WEST of ring A issued a write command. In response to the write command, the node WEST of ring A will look for an empty slot in the information stream flowing around ring A. Once an empty slot is found, the processor 12 will insert via the communications processor 20 the desired message. Node NORTH of ring A will relay this message to node SOUTH of ring B, which in turn, will transmit this message to node NORTH of ring B. Node NORTH of ring B will then relay this message to node SOUTH of ring D, which in turn, will transmit the message to node NORTH of ring D. Node NORTH of ring D will relay this message to node WEST of ring E, which in turn, will transmit the message to node EAST of ring E. Node EAST of ring E will relay this message to node NORTH of ring F, which in turn, will transmit this message to node SOUTH of ring F. Node SOUTH of ring F will relay this message to node NORTH of ring H which in turn will transmit the message to node EAST of ring H. Node EAST of ring H will relay the message to node WEST of ring I, which in turn will transmit the message to node NORTH of ring I. Upon the issuance of a read command by the communications procesor 20 attached to the node NORTH of ring I, the message will be relayed to the device 10.

It is important to note that a number of communications can occur simultaneously. For example, a device 10 attached to node SOUTH of ring C could communicate with node EAST of ring G concurrently with the communication described above.

Figure 2:
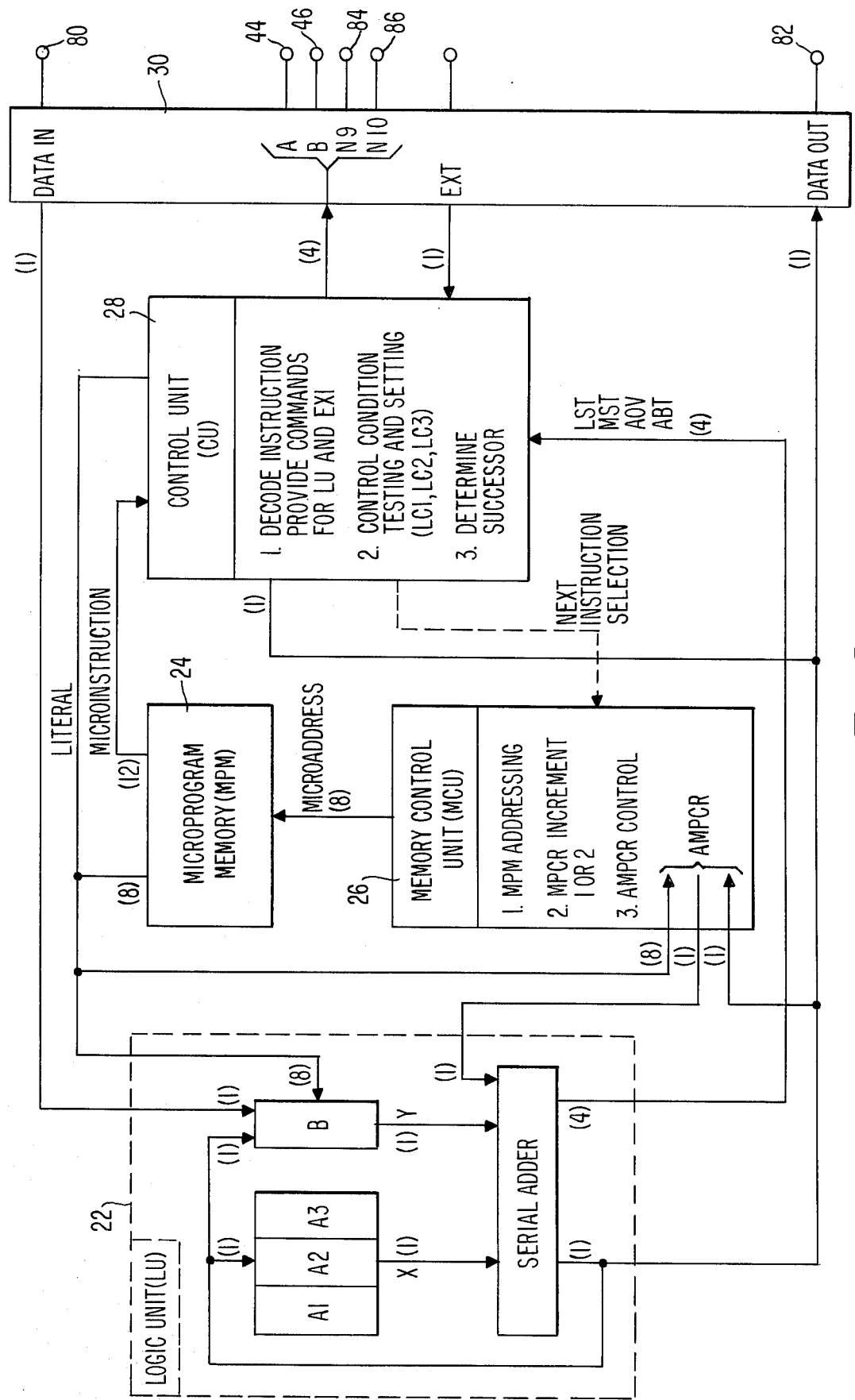
FIG. 2 is a functional block diagram of a communications processor used in the communications system of the present invention.

A communications processor suitable for the practice of the present invention is shown in FIG. 2. The organization and operation of the processor of FIG. 2 will be discussed in detail to the extent necessary to provide an understanding of the operation and interrelation with the interconnection scheme with which the present invention is directed. The processor of FIG. 2 is the subject of U.S. patent application by Ulbe Faber, Ser. No. 307,863, entitled "LSI Programmable Processor", filed Nov. 20, 1972, now U.S. Pat. No. 3,878,514, issued Apr. 15, 1975, and assigned to the assignee of the of the present application, and is hereby incorporated by reference. A more detailed description of the organization and operation of the processor of FIG. 2 is to be found in the above-cited Faber et al application.

The communications processor 20 is suitable for implementation in a variety of logic families as well as in large scale integration (LSI). In the preferred embodiment, the processor 20 is completely fabricated on a single semiconductor chip. In this LSI version, the single chip includes both a bit-serial-by-byte processor circuitry and a read-only microprogram memory (ROM) packaged in one multi-pin DIP package.

Architecturally, the communications processor 20 is comprised of five functional parts, see FIG. 2. These are the logic unit (LU) 22, which includes the data registers and a serial adder; the microprogram memory (MPM) 24, which stores the microinstruction sequences created by the microprogrammer; the memory control unit (MCU) 26, which includes the registers for addressing of the microprogram memory; the control unit (CU) 28, which provides the timing controls, successor (next instruction) determination and instruction decoding; and the external interface (EXI) 30, which in the LSI version is a multi-pin interface to the external environment.

In the LSI version of the communications processor 20, the microprogram memory 24 contains 256 words, each word being 12 bits in length. In this LSI version, the memory contains only executable instructions and cannot be changed under program control due to the ROM nature of the memory. The 12-bit instructions are decoded into one of three types, namely, literal, conditional, and logical. Each of these instructions will be described later.

Figure 3:
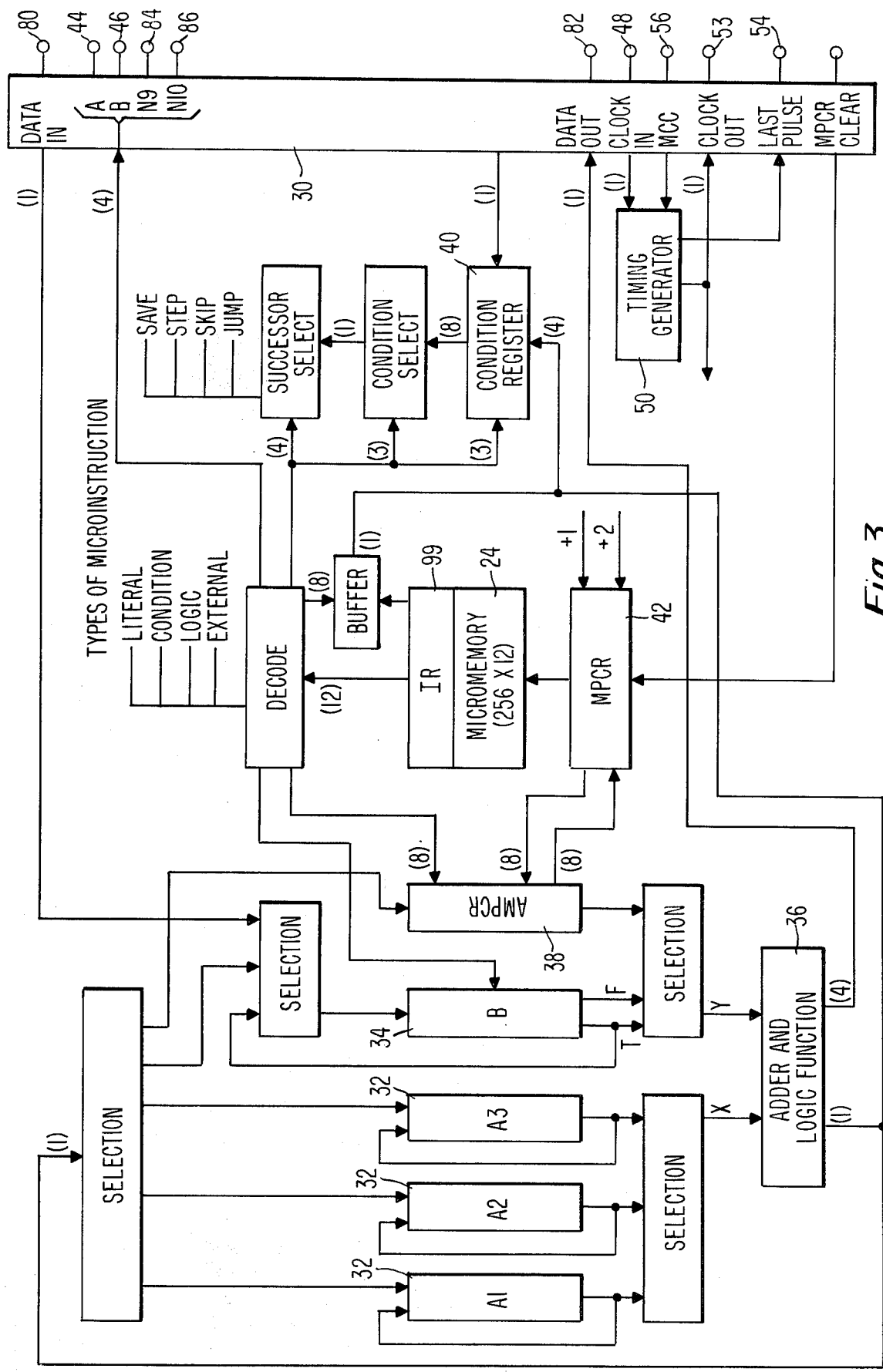
FIG. 3 is a detailed block diagram of the communications processor of FIG. 2.

More specifically, with reference to FIG. 3, the logic unit 22 includes three 8-bit A registers 32, an 8-bit register 34, a serial adder 36, and selector logic for specifying the appropriate inputs and outputs of the A registers 32, the B register 34, and the serial adder 36. The A registers 32 and the B register 34 are recirculating static shift registers, such that information can be transferred into the adder 36 without changing the contents of the registers. The X inputs to the adder 36 are the contents of any of the A registers 32 or the quantity ZERO, and the Y inputs to the adder are the contents of the B register 34 or its complement, the contents of an alternate microprogram count register (AMPCR) 38, which is a register associated with the memory control unit 26, or the quantity ZERO. The output of the adder 36 can be gated into any of the A registers 32, the B register 34, the AMPCR 38, and a number of external registers via a serial DATA OUT line 82, which will be described later. The serial adder 36, in the preferred embodiment, is capable of implementing eight basic operations (X+Y, X+Y+L, XOR, EQV, AND, OR, NAND and NOR). When these operations are combined with unique X and Y inputs as well as the various possible destination selections for the output of the adder 36, over a thousand different combinations become available to the microprogrammer. The adder 36 also provides four condition signals to a condition register 40, which is part of the control unit 28. These condition signals are (1) that the least significant bit of the adder output is true (LST); (2) that the most significant bit of the adder output is true (MST); (3) that there is an adder overflow (AOV); and (4) that all the bits of the output of the adder are true (ABT). For any given logic unit operations, these conditions are set, when the associated bit is true and reset, when false. These logic unit conditions do not change until the occurrence of the next operation associated with the logic unit and are testable using a condition test instruction which will be described later.

The memory control unit 26 is comprised primarily of two 8-bit registers, namely, the microprogram count register (MPCR) 42 and the alternate microprogram count register (AMPCR) 38. The MPCR 42 is an 8-bit counter that can be incremented by one or two and is utilized in selecting the next instruction (successor) from the microprogram memory 24. The function of the AMPCR 38 is to store jump addresses which permit the changing of the sequence of instructions. An instruction retrieved from the microprogram memory is placed in an instruction register 99.

The control unit 28 of the communications processor 20 provides eight testable conditions, condition selection logic, successor determination logic, instruction decoding logic and timing control for the processor. The eight conditions which may be tested are the AOV, the LST, the MST, and the ABT, which have already been mentioned; three local conditions (LC1, LC2 and LC3) settable or resettable under program control; and an external asynchronous condition EXT. The successor selection is either the contents of the MPCR 42 incremented by one or two, or the contents of the AMPCR 38.

The external interface 30 is capable of handling four types of signals, namely, data, control, timing and power. With regards to the data signals, the processor 20 has two basic interface signals for external data. The first is a bit-serial-by-byte input (DATA IN) and the second is a bit-serial-by-byte output (DATA OUT). A DATA IN line 80 is the main data input bus for the communications processor 20, while the DATA OUT line 82 is the primary data output bus from the communications processor 20. Input data into the processor is controlled by a BEX command which is implemented as part of a logic unit instruction. This BEX command enables the serial gating of information into the B register 34 via the DATA IN line 80. Data information from the processor is always sent out in 8-bit bursts or bytes, and can be synchronously gated into an external shift register with the use of clock signals provided by the communications processor 20 for this purpose.

The above-mentioned EXT condition signal level is controlled and provided externally and tested by the condition test instruction. It can be used, for example, to receive input data or to indicate an interrupt is present in an external interrupt register.

With regard to control signals, the communications processor 20 provides four external control signals to control the gating of information into and out of the communications processor 20. These four control signals also indicate how information is to be used by the external environment. Two of these signals are communicated via an A line 44 and a B line 46 from the communications processor 20. When the signals on these two lines are decoded, they designate the type of operation occurring internally to and externally to the processor 20. In the preferred embodiment, the combination of control signals on A line 44 and B line 46 are as follows: If the signal on the A line 44 is a logical ONE, while the signal on the B line 46 is a logical ZERO, this combination of control signals will indicate that a logic unit type instruction is in progress and that one of four external registers has been selected to supply data information to the DATA IN line 80. In addition, this combination of control signals also indicates that external data is being gated into the B register 36. When the signal on the A line 44 is a logical ZERO and the control signal on the B line 46 is a logical ONE, an OUT type logic unit instruction is in progress. An OUT type instruction specifies that one of four external registers has been selected to receive data information from the DATA OUT line 82. When both control signals on the A line 44 and the B line 46 are a logical ONE, a DEV operation is indicated. This operation specifies that a literal instruction is in progress internally and that an 8-bit literal from the microprogram memory 24 is to be transferred out of the communications processor 20 via the DATA OUT line 82 to an external register. When both the control signals on the A line 44 and the B line 46 are logical ZERO's, this will indicate a default code for all other internal instructions other than the three specified above, namely, the BEX, the OUT and the DEV type instructions.

To determine which external register is to receive information via the DATA OUT line 82 or to provide information via the DATA IN line 80, two control signals provided by the decoding of a microinstruction retrieved from the microprogram memory are utilized. These two control signals are derived from the ninth and tenth bit position of a logic unit type instruction. These two control signals are communicated externally via lines 84, 86 from the communications processor 20, and can be combined with the decoded BEX or OUT type operation to determine which external register was internally selected. This, for example, would allow up to four input and four output shift registers to be selected with a single instruction, assuming that external gating logic was provided. As will be seen, this external gating logic is in the form of a decoder 152.

An important external control signal which is supplied to the communications processor 20 is the MPCR clear signal. This signal clears the microprogram counter register 42. This, in turn, will enable the setting of the address of the next instruction to be executed to be at location ZERO.

Another important group of signals associated with the communications processor 20 are timing signals. In the preferred embodiment, the communications processor 20 requires clocking signals which are supplied externally. External clock signals are supplied to the external interface 30 via a CLOCK IN line 48 to a timing generator 50, which is part of the control unit 28 of the communications processor 20. The timing generator 50 controls the bit frequency and generates from the externally provided clock signals the pulses which are used to gate and control all internal as well as external shift registers associated with the communications processor 20. Clock pulses generated by the timing generator 50, which are used to synchronize the transfer of information to external shift registers, are supplied via a CLOCK OUT line 53 of the external interface 30. Another clock signal provided by the timing generator 50 is the LAST PULSE signal which indicates that eight data shift pulses have occurred. The LAST PULSE signal will indicate that an external shift registers has been loaded or that information has been accepted by the communications processor 20 from an external shift register. In addition, upon the generation of the LAST PULSE signal by the timing generator, the next instruction specified by the MPCR 42 will be retrieved from the microprogram memory 24 and loaded into the instruction register 99. Simultaneously, the LAST PULSE will also inhibit the further supply of clock signals to the timing generator 50, This, in turn, will inhibit the operation of the timing generator 50. The LAST PULSE signal is also provided as an output signal to the external interface 30 via a LAST PULSE terminal 54.

To initiate the execution of an instruction stored in the instruction register 99, a MEMORY CYCLE CONTINUE (MCC) signal is required. This MCC signal is externally supplied to the timing generator 50 via the external interface 30 and a MCC line 56. Since the timing generator 50 is inhibited upon the generation internally of a LAST PULSE signal, further timing pulses for the communications processor 20 must await the receipt of a MEMORY CYCLE CONTINUE signal which will remove the inhibit created by the LAST PULSE. Thus, it is readily apparent that the MCC signal can be used to slow the execution of successive microinstructions stored in the microprogram memory 24 to any frequency including single step. In the preferred embodiment, however, regardless of the frequency of execution, the basic word length of the communications processor 20 in the LSI version, is eight bits. Additional LSI chips can be added modularly, to increase the word length in multiples of the basic word length.

Although in the preferred embodiment, the communications processor 20 is serially implemented, the fetch of the next instruction (during the LAST PULSE) and the execution of the present instruction are overlapped. This fetch-execute cycle, in the preferred embodiment, requires nine clock signals. As is readily apparent, for continuous operation of the communications processor 20, an MCC pulse is required every nine clock or bit periods.

Referring now briefly to the instruction set for the communications processor 20, there are basically three types of instructions executed by the communications processor 20. These are the literal type instructions, the condition test type instructions, and the logic unit type instructions. With regard to literal instructions, there are four literal type instructions, each utilizing an 8-bit constant retrieved from the microprogram memory 24 as part of the instructions. These are: (1) literal to the B register 34; (2) literal to the alternate microprogram counter register (AMCPR) 38; (3) GO TO, i.e., literal to the microprogram counter register 42; and (4) literal to an external device register or DEV type literal.

The condition test type instruction checks one of the eight specified conditions, previously discussed (i.e., four logic; three local flags and one external), and executes the indicated true or false successor depending upon the outcome of the test. The possible successors are STEP, which is step to the next instruction specified by the MPCR 42; SKIP, which is skip to the second next instruction specified by the MPCR 42; JUMP, which indicates executing the instruction specified by the AMPCR register 38; and SAVE, which steps to the next instruction specified by the MPCR 42 and saves the present address incremented by one in the AMPCR register 38. Any successor not explicitly stated is a STEP successor by default, while all other microinstructions have an implicit successor of STEP. If, however, it is desired to have an unconditional successor, then both the true and false successors should be the same.

Referring now to the logic unit type instruction. As previously described, the adder 36 is capable of executing eight operations from which over twenty basic operations are available with the appropriate X and Y input selects. The logic unit type instruction specifies the appropriate X input to the adder 36, and the Y input to the adder 36, the type of function to be performed by the adder 36, and the destination of the output of the adder 36. The destination which can be specified by a logic unit type of instruction falls into four major groups. The first group comprises the four internal shift registers, namely, the three A registers 32 and the B register 34. The second group comprises four registers external to the communications processor 20. The third group is a variation of the first group in that not only is one of four internal shift registers selected to receive the output of the adder 36, but in addition, the B register 34 is selected to be loaded from an external shift register simultaneously with the loading of the selected internal register. The last group is also a variation of the first group in that not only is one of the four internal registers specified, but in addition, a single bit right shift of the selected register is specified, with the adder 36 filling the most significant bit position.

As discussed in the preferred embodiment, the intrasystem communication is essentially a ring-type communications loop utilizing serial transmission techniques for both data information signals and control signals. Each communications processor 20 interacts with this communications loop at points, which for purposes of this specification are referred to as nodes. As shown in FIG. 1, each communications processor 20 is connected to a communications loop 100 via a node 102. Peripheral devices 10, such as card readers, tape units, etc. and processor 12 can be connected to the communications loop 100 through the communications processor 20 in any manner well known in the art. As will be demonstrated, communications between a device 10 or a processor 12 and the communications processor 20 occur independently of the operation of the communications loop 100.

As will be described in detail, the node 102 can pass information through itself, along the communications loop 100, extract information from the communications loop 100 for the communications processor 20 associated with the node, or inject information from the associated processor into the stream of information flowing around the communications loop 100. By employing serial techniques, the resulting communications loop 100 is essentially a bus in wich information flows in one circular direction. Moreover, the number of physical wires and interconnections is minimized and the intra-communications system which results, as a whole, is greatly simplified. Since communications are serial, the node 102 can become independent of the word size of the communications processor 20. The only requirements imposed by the serial scheme of the present invention are that word boundaries must be identified, data information must be distinguished from control information, and that a communications processor 20 receiving or transmitting information must synchronize to the information flowing along the communications loop 100.

As discussed previously, in the preferred embodiment, each communications processor 20 requires an externally supplied clock. To eliminate the necessity of a master clock and the problem of synchronizing each communications processor 20 to the master, or providing a separate clock for each communications processor 20, and the corresponding logic required to synchronize the clock of one processor to that of another, the clock requirement for each communications processor 20 is incorporated as part of the node 102. The clock for each communications processor 20 would then be synchronized to the serial data stream. To accomplish this, the serial information is transmitted in a somewhat modified Mauchly code where the clock is part of the data as shown in FIG. 4. Employing this scheme permits the clock to be derived from the serial information stream where each communications processor 20 will be synchronized to the information stream and no additional clock circuitry outside of the node 102 will be required. Since the clock is derived from the data, the distance between any two sequential nodes along the communications loop 100 will not effect the synchronization or the operation of the intra-communications system. The only effect distance between any two nodes imposes will be the time delay due to the length of the communications loop 100. When the distance between two nodes is such that the signal level is degraded, a repeater can be inserted on the communications loop 100 between the processors. As will be described in detail, the node 102 will operate as a repeater when not connected to a communications processor 20.

Referring now to the transmission scheme, a conventional Mauchly code requires a signal transition at the beginning of every clock or bit period. A binary ZERO would be represented by a signal transition from low to high at the end of the bit period, while a binary ONE would be represented by a signal transition from high to low at the end of a bit period. Signal level transitions within the bit periods are ignored. Each character is ten clock periods in duration. In the preferred embodiment, this Mauchly code has been modified to delete a transition at the beginning of the second clock or bit period of each character. This missing signal transition is identified as time $t_x$ in FIG. 4. To enable the node 102 to distinguish which information signals are data signals and which information signals are control signals, an arbitrary selection was made. If the signal transition at the beginning of the clock or bit period immediately following time $t_x$ (beginning of third clock period of character), which is the missing signal transition, is from low to high, then the information signals which follow are data signals. Conversely, if the signal transition is from high to low, then the information signals which follow are control signals.

It is important to note that in utilizing a conventional Mauchly code, a separate sync pulse is required to synchronize the system to the code. Otherwise, there would be no way to distinguish between signal transitions which actually do occur at the beginning or end of a bit or clock period and those which occur in between.

As will be apparent from the following discussion, the missing signal transition modification to the conventional Mauchly code eliminates the necessity for a separate sync pulse.

As was discussed with regard to the description of the communications processor 20, a MEMORY CYCLE CONTINUE (MCC) signal must be supplied to re-enable the timing generator 50 of the communications processor 20 after the occurrence of a LAST PULSE. Once enabled, the timing generator 50 will provide clock signals for the communications processor 20 to permit the implementation of the operation specified by the retrieved instruction in the instruction register 99. Upon completion of the operation, the LAST PULSE signal is again generated and will inhibit the timing generator 50 from providing further clock signals until another MCC signal is supplied. Thus, while it is important to synchronize the communications processor 20 to the information bit stream flowing along the communications loop 100, it is equally important for the communications processor 20 to be synchronized to the word or character. As will be seen, the missing signal transition at times $t_x$ will enable the communications processor 20 to be synchronized to the word or character. From this missing signal transition, the necessary MCC pulse will be generated by the node 102 and supplied to the communications processor 20 attached to the node. The communications processor 20 will only require a maximum of two characters to synchronize to the information stream after it has been connected to a node 102.

Referring now to the node 102 of the present invention. A functional block diagram of the node 102 is shown in FIG. 5. The node 102 can be viewed as comprised of five functional sections. These are the input sections 106, the timing section 108, the node logic section 110, the processor interface section 112, and the output section 114. The input section 106 receives signals from the communications loop 100 and separate timing signals from information signals, while the timing section 108 generates the appropriate clock signals for the node 102 and the communications processor 20 from timing signals supplied by the input section 106. The processor interface section 112 supplies the node logic section 110 with control signals from the communications processor 20. These control signals indicate the nature of the operation implemented by the communications processor 20 attached to the interface section 112. The processor interface section 112 of a node 102 is the interface with the communications loop 100 for a communications processor 20.

In response to the control signals received from the attached communications processor 20, the node logic 110 determines when a read or write operation can occur. To implement a read operation for the communications processor 20, the node logic section 110 compares the address specified by the control portion of the information signals received from the communications loop 100 with the address on the attached communications processor 20. Upon comparison, the data signals, which follow the control portion of the information signals in the information stream flowing in communications loop 100 to detect when space is available in the information stream to insert data information from the attached communications processor 20. The output section 114 of the node 102 recombines timing signals with information signals received from the attached processor or with information signals separated by the input section 106. Thus, the format of signals leaving the node 102 are to the format of the signals which were received by the node 102.

When a communications processor 20 requests a read or write operation from or to the communications loop 100, the processor interface section 112 will generate in response to control signals received from the communications processor, the proper signals which will inhibit the flow of clock signals to the communications processor 20. As a result, the communications processor 20 will be prevented from executing any instruction until clock pulses are again supplied by the node 102. Secondly, the processor interface section 112 will direct the node logic section 110 to examine the information signals received by the input section 106 from the communications loop 100. Upon the detection of a missing signal level transition immediately followed by a signal level transition from high to low (this indicates that control signals will follow), the node logic section 110 will examine the contents of a byte of control signals received from the communications loop 100. For example, this control byte could be all "zero's" which indicates an empty slot, or this control byte could be a binary number specified previously by another communications processor 20 attached to the communications loop 100. In examining the signals of the control byte, the node logic 110 compares these signals with the signals supplied by the attached communications processor 20 via the processor interface section 112. If no comparison is found, the node logic section 110 will wait for the next byte of control signals from the communications loop 100. When a comparison is finally achieved, a number of actions will be taken by the node 102, depending upon the type of operation specified by the communications processor 20 attached to the node 102.

If comparison is achieved and the communications processor 20 has issued a read operation, then the byte of control signals received from the communications loop 100 will be modified by the node 102 to be an empty slot (to be used by another processor). Also, the clock inhibit generated by the processor interface section 112 will be removed, allowing the execution of the read instruction by the communications processor 20 and a transfer of data signal from the communications loop 100 to the processor 20. For a write operation, the byte of control information from the communications loop 100 (which will be an empty slot) will be modified to be a control word specified by the communications processor 20. This control word will normally be the number identification that will be used by the destination communications processor 20. In addition, the clock inhibit function will be removed, allowing the write instruction to be executed by the communications processor 20. Data signals from the communications processor 20 would then be inserted onto the information stream flowing along the communications loop 100.

Figure 6:
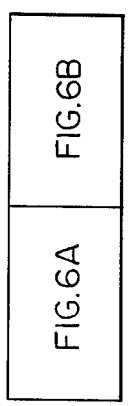
FIG. 6, which comprises
Figure 6B:
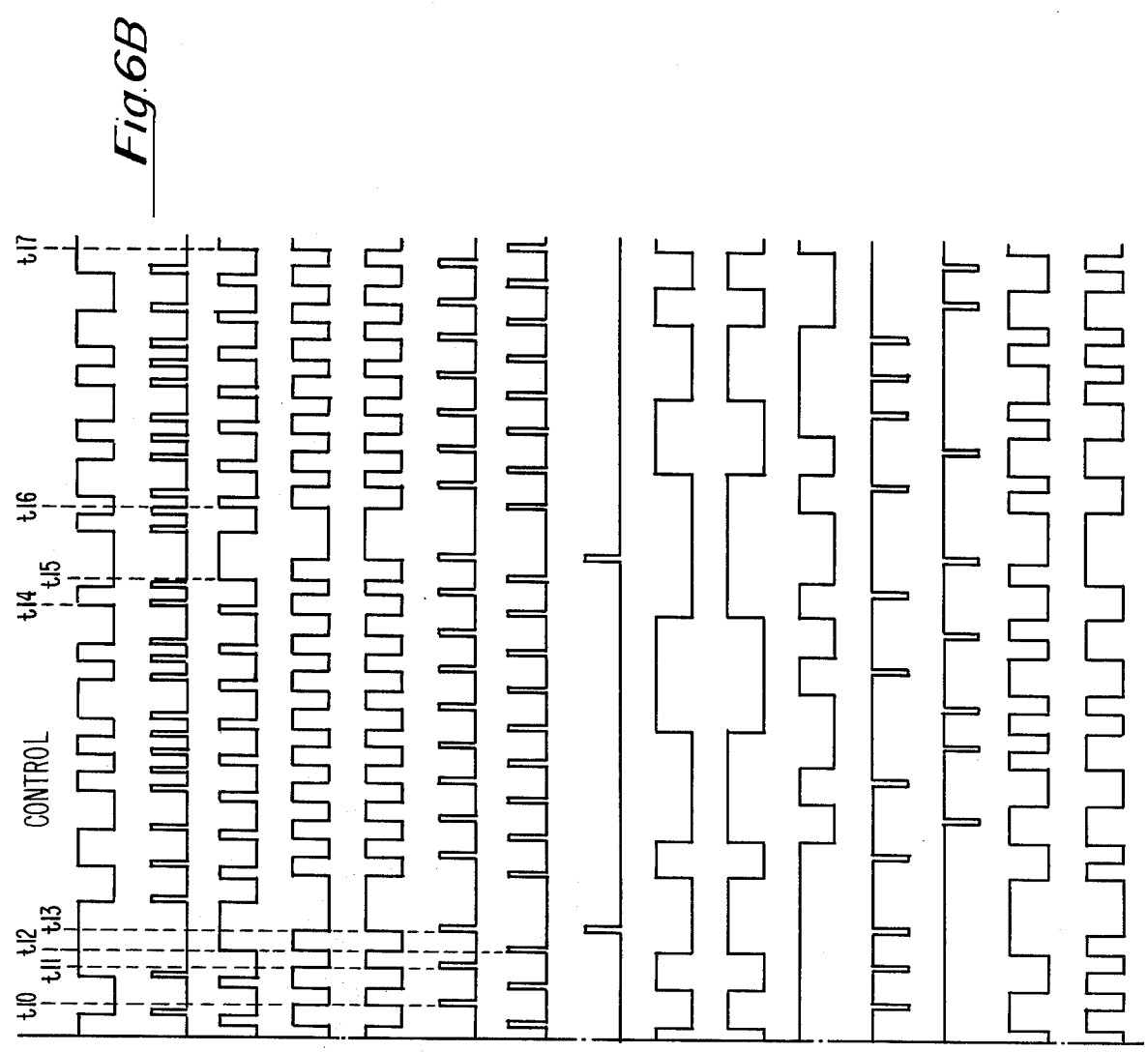

FIG. 6 is a functional timing diagram for the node 102. As shown, the clock inhibit is decoded by the node 102 whenever an attached communications processor 20 implements a read operation or a write operation. This clock inhibit would hold the communications processor 20 indefinitely if the requested operation did not occur, thereby immobilizing the communications processor 20. To prevent an undefined indefinite halt, the clock inhibit can be removed by an external interrupt signal supplied to the node 102. For example, the interrupt could be a delayed pulse which is initiated when a read or write operation is implemented by the communications processor 20. The communications processor 20, in this situation, can be programmed to detect if a read or write request has been completed with or without the interrupt.

Referring now to the implementation of the node 102. The node 102 represents a "device" to the communications processor 20, and as such, is selected as an input for the communications processor by the decoding of input select signals to form a BEX-2 condition. Similarly, when the node is used to send data to the communications loop 100, the node 102 responds to the decoded output control signal OUT-2 of the communications processor 20. As briefly discussed, a significant feature of the design of the node 102 is the clock derivation logic that extracts timing from the data and control signal stream of the communications loop 100, and in turn, provides clock signals for the attached communications processor 20. As will be described, this logic also gates the provided clock so that during those phases when the attached communications processor 20 is awaiting data from the communications loop 100, its operations are inhibited by the absence of the clock.

Figure 7A:
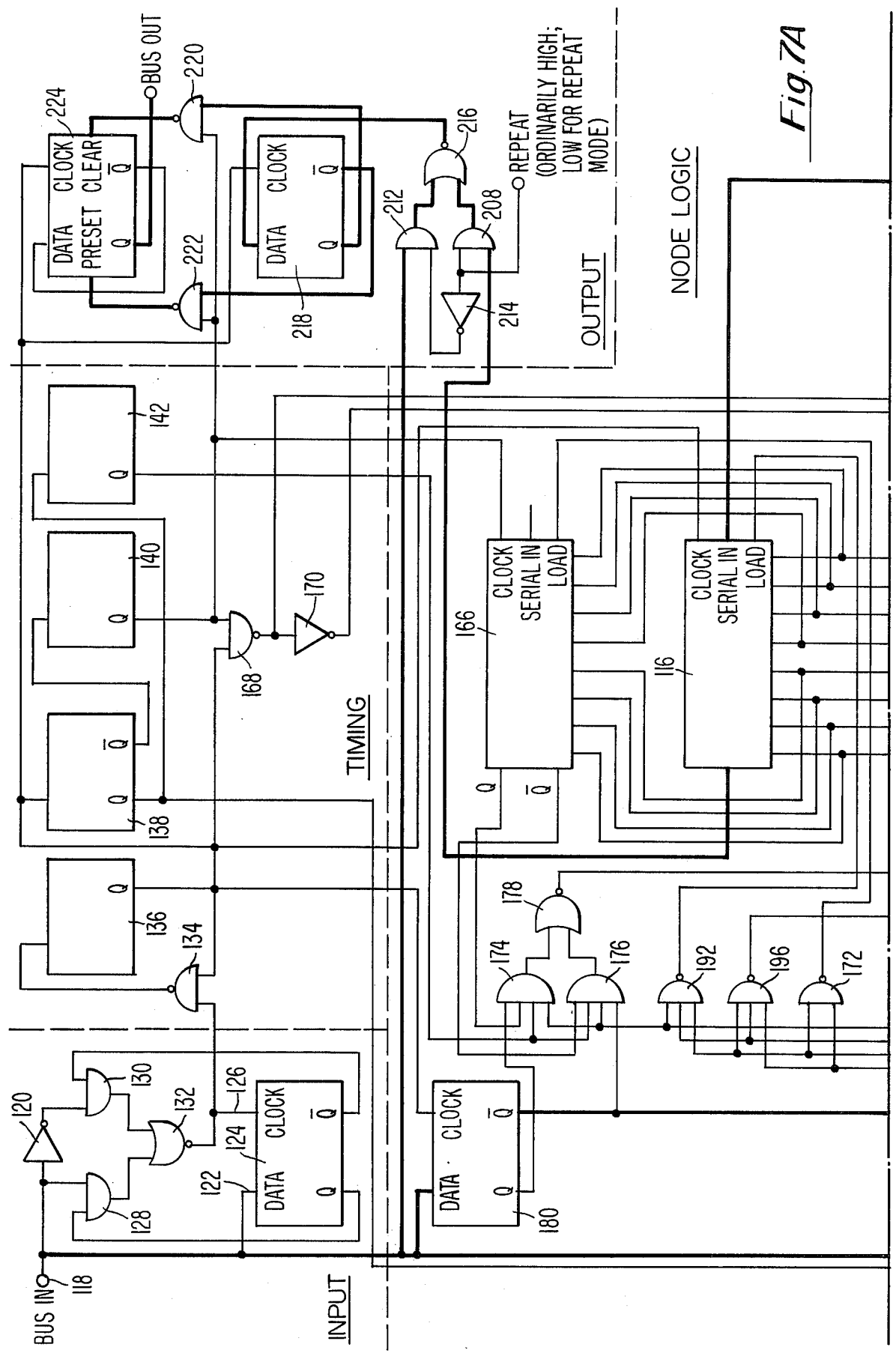

Essentially, the node 102 can be viewed as an extension of the communications loop 100. An 8-bit long loop shift register 116, which is part of the node logic section 110, provides a path for the loop 100 through the node 102, see FIG. 7. As a result, this loop shift register 116 will cause an 8-bit delay between signals received at the input of the node 102 and signals at the output of the node. The structure of the register 116 is similar to that of register 164, which will be described later. Signals received from the communications loop 100 are applied to a BUS IN terminal 118 of the node 102. The BUS IN terminal 118, which is part of the input section 106 of the node 102, is connected as an input to an inverter 120 and also to the data terminal 122 of a flip-flop 124. The flip-flop 124 is a conventional D-type positive edge triggered flip-flop shown in FIG. 8. In addition to the data terminal 122, the flip-flop 124 includes a clock terminal 126 and complementary output terminals Q and $\overline{Q}$. A truth table for flip-flop 124 is applied as one input to a two-input AND gate 128. The other input to AND gate 128 is connected to the BUS IN terminal 118. The output of the inverter 120 is connected as one input to a two-input AND gate 130. The other input to AND gate 130 is from the $\overline{Q}$ output of the flip-flop 124. The outputs of AND gates 128 and 130 are supplied as inputs to a NOR gate 132, the output of which is connected to the clock terminal 126 of flip-flop 124. As shown in FIG. 7, inverter 120, AND gates 128 and 130, NOR gate 132, and flip-flop 124 along with the BUS IN terminal 118 comprises the input section 106 of node 102.

Referring now to FIG. 6, Waveform A illustrates a typical example of information signals transmitted by the communications loop 100. As seen in Waveform A, a byte of control type signals is followed by a byte of data type signals. Control type signals are usually preceded by a positive two clock or bit period time interval while data type signals are usually preceded by a negative two clock or period time interval.

To illustrate the operation of the input section 106 of the node 102, the signal level at time $t_0$ as shown in waveform A is arbitrarily selected to be high. Therefore, the data terminal of flip-flop 124 is high. Assuming now that the Q output of flip-flop 124 is high, the second input into AND gate 128 will also be high. Thus, regardless of the output of AND gate 130, the output of the NOR gate 132 at this time $t_0$ must be low. At time $t_1$ the signal level switches from high to low as shown in waveform A of FIG. 6. This information signal level transition will cause the output of AND gate 128 to be low regardless of the $\overline{Q}$ output of the flip-flop 124. In addition, since the $\overline{Q}$ output of the flip-flop 124 at time $t_0$ was assumed to be low, the output of the NOR gate 132 switches high since both inputs into the NOR gate 132 are now low. According to the truth table shown in FIG. 9 for flip-flop 124, a positive-going signal applied to the clock terminal 126 of flip-flop 124, along with a low level signal at the data terminal 122 of flip-flop 124, causes the Q output to switch low and the $\overline{Q}$ output to switch high. This switching will have no effect upon the output of AND gate 128, but will cause the output of AND gate 130 to switch high at time $t_2$. This in turn, will cause the output of the NOR gate 132 to switch low. As shown in the truth table for flip-flop 124, this signal level transition at the output of the NOR gate 132 when applied to the clock terminal 126 of the flip-flop 124 will have no effect upon the outputs of the flip-flop 124.

As shown in waveform A, at time $t_3$, the signal level of the information signals received from the communications loop 100 switches high. This signal level transition will not effect the output of AND gate 128, but will cause the output of AND gate 130 to switch low. In turn, the output of NOR gate 132 will now switch high, and since the signal level now applied to the data terminal 122 of the flip-flop 124 is high, the Q output of the flip-flop 124 will switch high, while the $\overline{Q}$ output will switch low. This signal level change at the outputs of flip-flop 124 will now cause the output of AND gate 128 to switch high, while the output of the AND gate 130 will remain unchanged. Since the output of AND gate 128 has now switched high, the output of NOR gate 132 will again switch low at time $t_4$.

It should now become apparent from this brief description, that the function of the input section 106 of the node 102 is to produce a pulse everytime there is a signal level transition in the information signals received from the communications loop 100. Note, the input section 106 does not differentiate between control type and data type signals. Rather, the input section 106 is designed to separate timing signals from information signals.

The output of the input section 106 of the node 102 is taken from the output of the NOR gate 132 and is applied as the input to the timing section 108. These signals, at the output of the NOR gate 132, which are illustrated in waveform B of FIG. 6, are applied to one input of a two-input NAND gate 132. The output of the NAND gate 134 is applied to the trigger input of a monostable multivibrator 136. The function of the monostable multivibrator 136 is to eliminate signal level transitions within the clock or bit period by producing a pulse having a time duration or interval approximately equal to 75% of the clock or bit period. Thus, the monostable multivibrator 136 provides a train of uniform pulses which would correspond to the signal level transitions of each of the information signals received at the BUS IN terminal 118 of the node 102. However, it should be readily apparent that the pulses of the monostable multivibrator 136 will not be synchronized with the signal level transitions at the beginning of each clock or bit period until an information identification pulse has been received by the node 102. Upon receipt of either a data identification or control identification pulse, all signal level transitions between clock and bit periods will be eliminated by the monostable multivibrator 136. The $\overline{Q}$ output of the monostable multivibrator 136 is shown as Waveform C in FIG. 6.

To provide the actual clock signals which will be supplied to the communications processor 20 attached to the node 102, a second monostable multivibrator 138 is employed. The $\overline{Q}$ output of monostable multivibrator 136 is applied to the trigger input of the monostable multivibrator 138. The monostable multivibrator 138 is designed to produce a pulse having a time duration or interval of approximately 50% of the clock or bit period of the information signals received from the communication loop 100. The $\overline{Q}$ output of monostable multivibrator 138 is shown as Waveform E in FIG. 6.

In addition to supplying the clock signals for the attached communications processor 20, the timing section 108 of a node 102 must also supply the clock signals for the node. In the preferred embodiment of the present invention, two additional monostable multivibrators 140, 142 are employed for this purpose. The trigger input for the monostable multivibrator 140 is the $\overline{Q}$ output of the monostable multivibrator 138. Both monostable multivibrators 140 and 142 are designed to produce a pulse having a time duration approximately 5% of the bit or clock period. The Q outputs of monostable multivibrators 140 and 142 are shown respectively, as Waveforms F and G of FIG. 6.

Figure 10:
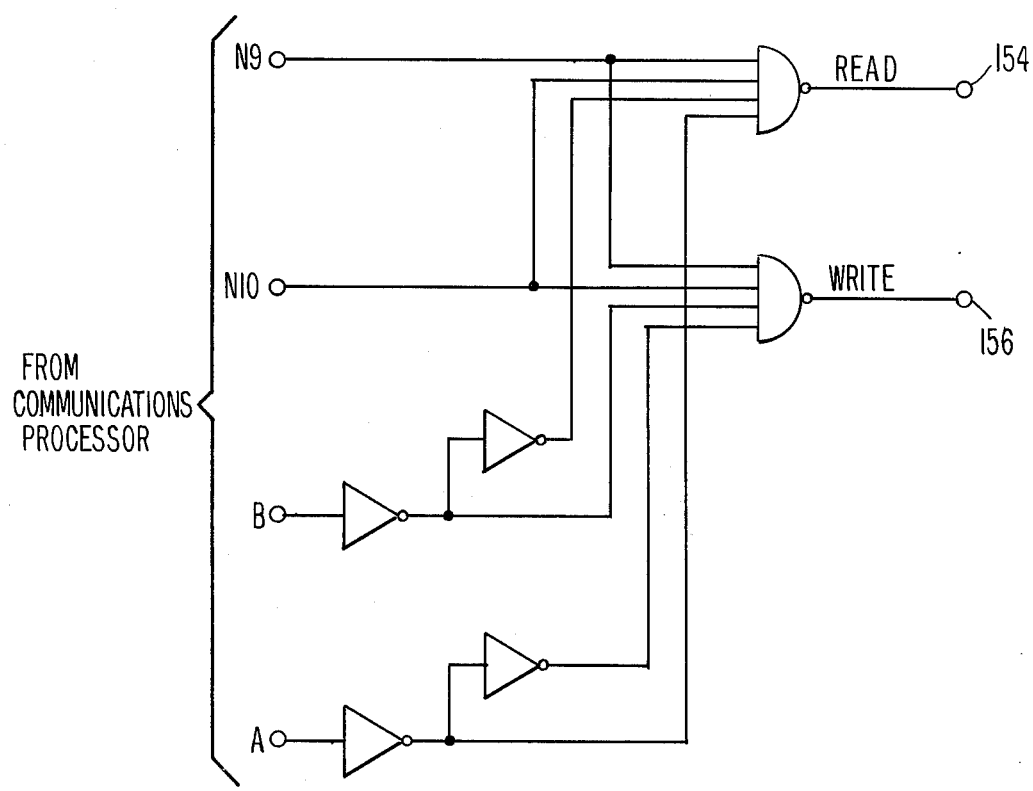
FIG. 10 is a logic diagram of a decoder used in the node of FIG. 7.

Referring now to the processor interface section 112 of the node 102, the output of a two-input NOR gate 144 is connected to the DATA IN line 80 of the communications processor 20. One input for the NOR gate 144 is from the output of a two-input AND gate 148 while the input for the NOR gate 144 is from the output of a two-input AND gate 146. The data input into the AND gate 148 is from the BUS IN terminal 118, while the data input for the AND gate 146 is reserved for a peripheral device associated with the attached communications processor 20. The control signal input for the AND gate 148 is from the output of an inverter 150. The input for the inverter 150 is from the output of a four line to two line decoder 152. The function of the decoder 152, which is shown in FIG. 10, is to decode the A, B, N9 and N10 control signals supplied by the attached communications processor 20 of the present invention. As discussed earlier, control signals N9 and N10, A and B are external control signals of the communications processor 20 which are used to indicate the flow of information into and out of the communications processor 20. Signals A and B inform the world external to the communications processor 20 what type of instruction the processor is executing. Signals N9 and N10 indicate to the outside world which one of four registers is specified during a logic unit "OUT" type instruction.

In the preferred embodiment, the decoder 152 will decode a request to read from the communications loop 100 to the attached processor 20 when the A control is a binary ZERO, the B control is a binary ONE, the N9 control is a binary ONE, and the N10 control is a binary ONE. The node 102 will implement a request from the attached communications processor 20 to write information onto the communications loop 100 when the A control is a binary ONE, the B control is a binary ZERO, and the N9 control and N10 control both are binary ONES. As shown in FIG. 7, the two outputs of the decoder 152 are identified as the R (read) terminal 54 and the W (write) terminal 156. As can readily be seen from the truth table for the decoder, which is also shown in FIG. 7, the signal appearing at the R terminal 154 is only low when a read request is received from the communications processor 20 attached to the node 102. Since the output of the decoder 152 is used to gate data type signals from the communications loop 100, or a peripheral device to the attached communications processor 20 via NOR gate 144, the R output terminal 154 of decoder 152 is connected as the input to the inverter 150 and as the control signal input to the AND gate 146.

As discussed earlier, the attached communications processor 20 requires externally supplied clock signals in order to execute an instruction. Thus, upon issuance of a read request by the attached communications processor 20, the node 102 must inhibit clock pulses from being supplied to the attached communications processor 20 until information signals received from the communications loop 100 are determined to be addressed for the device 10 or processor 12 associated with the communications processor 20. Similarly, when the attached communications processor 20 issues a write request to the node 102, the node 102 must inhibit further clock pulses from being supplied to the attached communications processor 20 until the node logic section 110 of the node 102 can determine that space is available along the communications loop 100 for inserting information without destroying valid information already on the communications loop. To provide this clock inhibit function, the R and W outputs 154, 156, respectively, of the decoder 152 are supplied as inputs to a NAND gate 158. The output of the NAND gate 158 is supplied to one input of a two-input AND gate 160 via an inverter 162. The other input into the AND gate 160 is from the Q output of the monostable multivibrator 138. As can be seen from a truth table for the decoder 152, the R and W output terminals 154, 156 of the decoder 152 are both always high except when a read request or a write request from the attached communications processor 20 is decoded. Thus, the output of the NAND gate 158 will be low except when a read or write request has been issued by the communications processor 20 attached to the node 102. This low output in turn, will be inverted by the inverter 162 before being applied as the control signal input to the AND gate 160. Since the other input to the AND gate 160 is from the Q output of the monostable multivibrator 138, which as discussed earlier, actually supplies the clock signals for the attached communications processor 20, it is apparent that clock signals will be supplied by the node 102 to the attached communications processor 20 at all times except when a read or a write request has been issued by the communications processor 20. Upon the issuance of a read or write request from the attached communications processor 20, the output of the NAND gate 158 will be high, resulting in a low being applied to the AND gate 160. This will inhibit the clock pulses being supplied by the Q output of the monostable multivibrator 138 from being gated by the AND gate 160 to the communications processor 20. If the operation requested by the attached communications processor 20 was a read request, the clock inhibit signal will not be removed until the node logic section 110 of the node 102 determines that the information signals received from the communications loop 100 is addressed for the attached communications processor 20. Upon that determination, the clock inhibit function is removed and the clock pulses from the Q output of the monostable multivibrator 138 are allowed to flow to the attached communications processor 20. Similarly, if the request from the attached communications processor 20 is a write operation, a clock inhibit signal will not be removed until the node logic section 110 determines that there is space available in the information stream.

Digressing back for the moment to the timing section 108 of the node 102, it will be remembered that a memory cycle complete (MCC) pulse is required by the attached communications processor 20. As discussed, the communications processor 20 internally generates at the completion of every instruction a clock inhibit function referred to as the LAST PULSE. This internal clock inhibit function will not be removed until a MCC pulse is externally received by the communications processor 20. Thus, in addition to the clock pulses supplied to the CLOCK IN line 48 of the attached communications processor 20, the timing section 108 of the node 102 must also supply the MCC pulses to the MCC line 56 of the attached communications processor 20. To accomplish this, the timing section 108 must generate a pulse which will be synchronized to the information stream flowing along the communications loop 100. From an examination of this information stream illustrated as Waveform A in FIG. 6, it is apparent that for synchronization the MCC pulse must occur in the same time interval allocated for the information signal identification, e.g., data or control. If this were otherwise, the resulting MCC pulse would not be synchronized to the words of the information stream. Thus, to generate the MCC pulse, the $\overline{Q}$ output of the monostable multivibrator 138 is applied as the trigger input to the monostable multivibrator 140, which in turn, produces a pulse having a time duration of approximately 5% of the clock or bit period of the information stream received from the communications loop 100. When the $\overline{Q}$ output of monostable multivibrator 136 (Waveform C) is gated with the Q output of the monostable multivibrator 140 (Waveform F) by an AND gate 168, a pulse will only result during the time intervals allocated to the identification of the signals of the information stream. The output of the AND gate 168 is supplied via an inverter 170 to the MCC line 56 of the attached communications processor 20. Thus, the communications processor 20 is provided with the necessary MCC pulse required to remove the clock inhibit function internally generated by the communications processor 20. Note, however, that when a read request or write request has been issued by the communications processor 20, the received MCC pulse removes only the internally generated clock inhibit function but not that which is generated by the decoder 152, the NAND gate 158, the inverter 162 and the AND gate 160.

Referring now to the circuitry related to the node logic section 110. Prior to the issuance of a read request, the communications processor 20 is programmed to execute an instruction which transmits to the node 102 via the DATA OUT line 82 of the attached communications processor 20, the identification number associated with that particular processor. This processor identification number is serially loaded in a serial-in parallel-out shift register 164. This instruction also specifies the fetching of the next instruction, which in this case, will be a read operation.

Upon the completion of this instruction and the receipt of the next successive MCC pulse (shown in Waveform H at time $t_5$ in FIG. 6) from the output of the inverter 170, the processor 20 will be programmed to execute the read (BEX-2) operation. However, upon the fetching of the read instruction, the decoder 152 provided the necessary signals to inhibit further gating of clock pulses to the CLOCK IN terminal 88 of the communications processor 20. No further clock pulses will be provided to the attached communications processor 20 until there is a determination that the address of the information received from the communications loop 100 is for the attached communications processor 20. This determination is made by comparing the processor identification number in the shift register 164 with the address specified by the control portion of the information stream received from the communications loop 100. Therefore, the processor identification number supplied by the execution of the previous instruction of the communications processor 20, must be maintained by the node logic section 110 until a proper comparison has been achieved.

Figure 11:
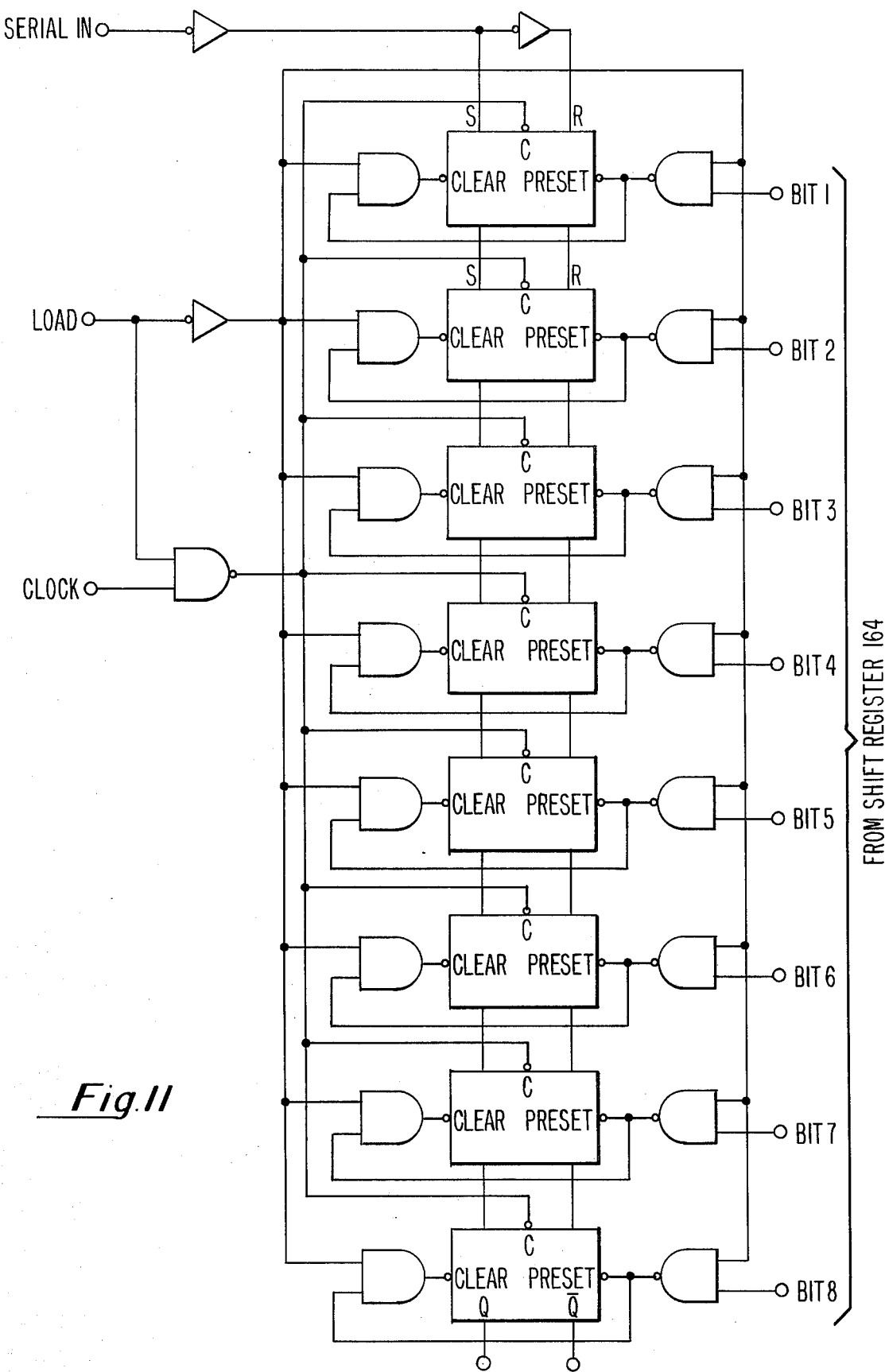
FIG. 11 a logic diagram of a parallel-in serial-out shift register used in the node of FIG. 7.

Associated with the serial-in parallel-out shift register 164 is parallel-in serial-out shift register 166. This parallel-in serial-out shift register 166, which is shown in FIG. 11, will be loaded by the same MCC pulse which would have initiated the read instruction of the communications processor 20, but for the clock inhibit generated by decoder 152. As shown in FIG. 7, the load command for the shift register 166 is provided by the output of a two-input AND gate 172. One input for the AND gate 172 is from the output of the inverter 150. The other input to the AND gate 172 is from the output of the inverter 170, which is the source of MCC pulses for the attached communications processor 20. It will be remembered that the input to the inverter 150 is connected to the R terminal 154 of the decoder 152. Also, it will be remembered that the signal appearing at the R terminal 154 of the decoder 152 will only be low when a read instruction is decoded by the decoder 152. Thus, just prior to the receipt of the next successive MCC pulse by the communications processor 20, the output of the inverter 150 will be high and the signal output of the inverter 170 (Waveform H) will be low. This will cause the output of the AND gate 172 to be high. As can be seen from FIG. 11, the shift register 166 requires a negative pulse to parallel load the shift register. Upon the receipt of a positive MCC pulse, the output of the AND gate 172 will momentarily go low, which in turn, will parallel load the shift register 166 with the processor identification number stored in the shift register 164. Upon the application of clock pulses to the shift register 166, the processor identification number now stored in the shift register 166 will be compared bit by bit with the information signals received from the communications loop 100 via the BUS IN terminal 118 of the node 102.

To perform the comparison, the gating network comprised of two four-input AND gates 174, 176 and a two-input NOR gate 178 are employed. The output of AND gates 174, 176 are connected as the inputs to the NOR gate 178. One input for both AND gates 174, 176 is from the output of the NAND gate 158, which is high only when a read or write instruction has been retrieved for execution by the attached communications processor 20. A second input common to AND gates 174 and 176 is from the Q output of the monostable multivibrator 142. As is shown in FIG. 7, the monostable multivibrator 142 is triggered by the Q output of the monostable multivibrator 138, while the monostable multivibrator 140 is triggered by the $\bar{Q}$ output of the monostable multivibrator 138. Since the monostable multivibrator 138 provides the actual clock signals for the communications processor 20, and since the monostable multivibrators 140 and 142 are designed to generate pulses having approximately the same time duration, the interval of time between the occurrence of a pulse at the output of the monostable multivibrator 142 and the occurrence of a pulse at the output of monostable multivibrator 140 is approximately equal to the pulse width of the clock pulses supplied to the communications processor 20. This feature is illustrated by Waveforms F and G in FIG. 6, which are respectively, the outputs of monostable multivibrators 140 and 142. A third input into the AND gate 174 is from the $\bar{Q}$ output of the shift register 166 while a third input into the AND gate 176 is from the Q output of the shift register 166. The fourth and last input into the AND gate 174 is from the Q output of a flip-flop 180, while the fourth and last input into the AND gate 176 is from the $\bar{Q}$ output of the flip-flop 180. The data terminal of the flip-flop 180 is connected to the BUS IN terminal 118 of the node 102, while the clock signals for the flip-flop 180 are provided from the $\bar{Q}$ output of the monostable multivibrator 136.

As will be seen, the function of the flip-flop 180 is to insert a delay in the stream of information signals received at the BUS IN terminal 118. Since the clock pulses for the attached communications processor 20 as well as the timing for the node 102 are derived from the signal level transitions of the information signal stream, it is obvious that these derived timing pulses are not generated simultaneously with the occurrence of the signal level transitions of the information pulses. To compensate for this difference between the timing pulses which are derived from the signal level transitions and the actual information pulses themselves, the flip-flop 180 is provided. Since the signals which clock the flip-flop 180 are derived from the $\bar{Q}$ output of the monostable multivibrator 136, which in turn was designed to remove pulses which resulted from signal level transitions within the clock or bit period of the information stream, the flip-flop 180 will transform the modified Mauchly code applied to its data terminal to a NRZ-Level or NRZ-Change type code. The Q and $\bar{Q}$ outputs of flip-flop 180 are illustrated as Waveforms J and I, respectively. An NRZ-Level code format is one in which a binary ONE is represented by one level (e.g., high) while a binary ZERO is represented by the other level (e.g., low). Note also from these waveforms that the output pulses of the flip-flop 180 are delayed approximately 75% of a bit or clock period from the bit or clock period of the signal level transition from which these pulses were derived. This delay is the result of the utilization of the output of the monostable multivibrator 136 as the clock for the flip-flop 180.

An analysis of the inputs into either the AND gate 174 or the AND gate 176 will reveal that two of the inputs are related to control signals while the two inputs are related to data signals. The two control signals which are applied as inputs to both AND gates 174 and 176 are, respectively, the output of the NAND gate 158 and the Q output of monostable multivibrator 142. Since the output of the NAND gate 158 is only positive when either a read request (BEX-2) or a write request (OUT-2) has been issued by the communications processor 20, it is apparent that the output of either the AND gate 174 or AND gate 176 can only be positive when a read or write request has been issued by the attached communications processor 20. The two data inputs into AND gate 174 or the AND gate 176 are, respectively, the outputs of the flip-flop 180 and the outputs of the shift register 166. When clocked by the output of the monostable multivibrator 142, the AND gate 174 gates the Q output of the flip-flop 180 and the $\overline{Q}$ output of the shift register 166, while the AND gate 176 gates the $\overline{Q}$ output of the flip-flop 180 and the Q output of the shift register 166. It should now be obvious that the clocks for the flip-flop 180 and the shift register 166 must occur before the clock for the AND gates 174 and 176. The clock for the shift register 166 is provided by the output of the monostable multivibrator 140. A comparison of Waveform F, which represents the clock for the shift register 166, and Waveform C, which represents the clock for the flip-flop 180, and Waveform G, which represents the clock for AND gates 174 and 176, will reveal that the shift register 166 is clocked first, while the flip-flop 180 and the AND gates 174 and 176 are clocked substantially simultaneously. Since as shown in FIG. 11, the shift register 166 is non-synchronous, the loading of the shift register 166 automatically presents at the Q and $\overline{Q}$ outputs of the shift register, the contents of the least significant bit position. Thus, at time $t_5$, as shown in FIG. 6, the output of the AND gate 172 will cause the shift register 166 to be loaded with the contents of the shift register 164. The binary levels of the least significant bit position of the loaded shift register 166 are concurrently applied, respectively, to the AND gate 176 and AND gate 174. At time $t_6$ (beginning of the third clock period of the information byte), the first information signal following the information identification control will appear at the data terminal of the flip-flop 180. At time $t_7$, the flip-flop 180 is clocked, and the Q output of the flip-flop 180 is applied as an input to the AND gate 174 while the $\overline{Q}$ output of the flip-flop 180 is applied as an input to the AND gate 176. Simultaneously, the AND gates 174 and 176 receive a clock pulse in the form of a positive pulse from the Q output of the monostable multivibrator 142 (Waveform G).

With the above-described respective inputs to the AND gates 174 and 176, the combination of the AND gates 174 and 176 and the NOR gate 178, in essence, perform a logical exclusive OR function upon these input signals. Since the output of the NOR gate 178 is ordinarily high, the application of the Q output of the monostable multivibrator 142 to the inputs of the AND gates 174 and 176 at time $t_7$, will cause the outputs of the NOR gate 178 to go low only if the signal supplied by the shift register 166 at time $t_5$ is not identical with the information signal received from the communications loop 100 via the BUS IN terminal 118. If at time $t_7$ the two signals are identical, the output of the NOR gate 178 will remain high, since the outputs of the AND gates 174 and 176 will be low. At time $t_8$, the shift register 166 is clocked, and the binary values of the second least significant bit position are presented to the AND gates 174 and 176. These binary values are compared with the binary value of the next successive information signal at time $t_9$, and so forth.

Figure 12:
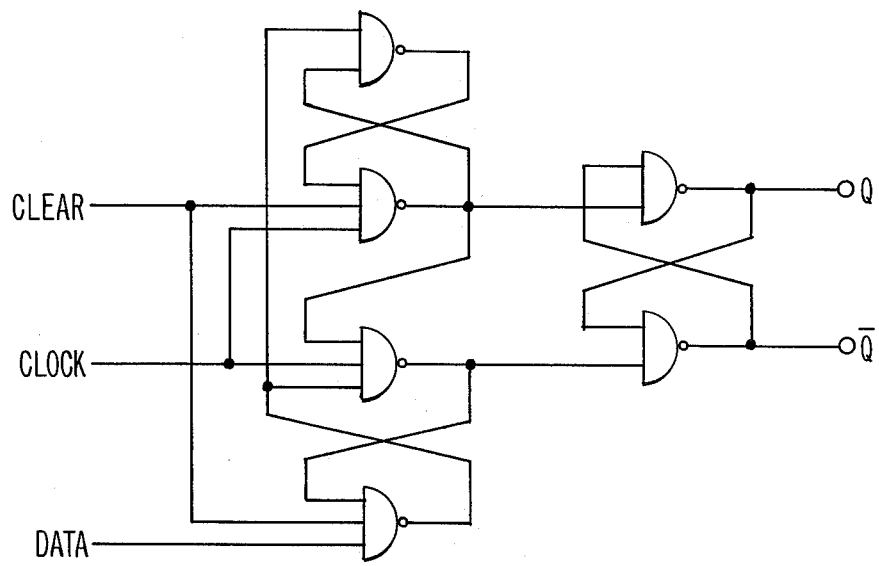
FIG. 12 is a logic diagram of a flip-flop used in the node of FIG. 7.
Figures 13, 15, 16:
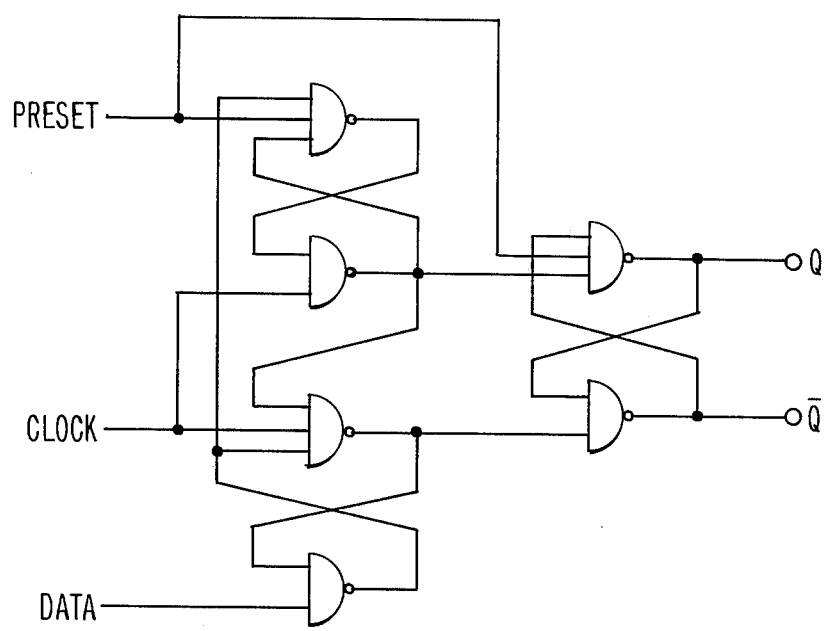
FIG. 13 is a truth table for the flip-flop of FIG. 12.
FIG. 15 is a logic diagram of a flip-flop used in the node of FIG. 7.
FIG. 16 is a truth table for the flip-flop of FIG. 15.

To maintain a record of whether all of the bits of an information word or byte received from the communications loop 100 are identical with the bits of the word stored in the shift register 166, a pair of flip-flops 182 and 184 are employed. Flip-flops 182 and 184 are similar in structure to flip-flops 124 and 180, with the exception that a clear function is included. Both of the flip-flops 182 and 184 are D-type positive edge triggered flip-flops. An example of this type of flip-flop is shown in FIG. 12. A truth table for flip-flops 182, 184 is shown in FIG. 13. The output of the NOR gate 178 is connected to the clear terminal of flip-flop 182, while the data terminal of flip-flop 182 is connected to the output of the NAND gate 158. The Q output of the flip-flop 182 is connected to the data terminal of flip-flop 184. Clock signals for the flip-flop 182 are provided by the output of the NAND gate 158, while clock signals for the flip-flop 184 are provided by the output of the inverter 170. From the truth table of FIG. 13, it is apparent that a negative pulse applied to the clear terminal of flip-flop 182 will cause the Q output of the flip-flop 182 to switch low, regardless of the signal level applied to the data terminal of that flip-flop. When either a read (BEX-2) or a write (OUT-2) operation is initiated by the attached communications processor 20, the signal level of the data terminal of flip-flop 182 will be high since it is connected to the output of the NAND gate 158. If the contents of the shift register 166 do correspond to the signals received from the communications loop 100, the output of the NOR gate 178 will always remain high, and therefore, no clear signal will be applied to the flip-flop 182. In this situation, the Q output of the flip-flop 182 will follow the signal level applied to its data terminal.

The clear signal for the flip-flop 184 is supplied by the output of a two-input AND gate 186. One input to the AND gate 186 is from the output of the inverter 170, while the other input to the AND gate 186 is from the output of the inverter 162. While the output of the inverter 170 is always a positive-going pulse, as shown in Waveform H, the output of the inverter 162 is only positive when either a read (BEX-2) or write (OUT-2) operation is initiated by the communications processor 20. Thus, when a read or write operation has been initiated by the communications processor 20, the output of the AND gate 186 at time $t_5$ will be a positive pulse.

With reference to the truth table shown in FIG. 13, when a positive pulse is applied to the clear terminal of the flip-flop 184, the outputs of flip-flop 184 will be dependent upon the signal level applied to the data terminal of the flip-flop. Thus, when the contents of the shift register 166 correspond exactly with the signals received from the communications loop 100, the Q output of the flip-flop 182 will follow the signal level at its data terminal. In this situation, when a correspondance does exist, the signal appearing at the data terminal of flip-flop 184 will be identical to the signal level appearing at the data terminal of flip-flop 182. On the other hand, when the contents of the shift register 166 do not correspond exactly with the signals received from the communications loop 100, the signal level appearing at the data terminal of flip-flop 184 will be the complement of the signal level appearing at the data terminal of flip-flop 182. It should now become apparent that flip-flop 182 will receive a clear signal for every bit of information received via the BUS IN terminal 118 from the communications loop 100, which does not correspond to the signals stored in the shift register 166. Since, in the preferred embodiment, both data information and control information transmitted along the communications loop 100 are in 8-bit bytes, the Q output of the flip-flop 182 will appropriately set the flip-flop 184 in accordance with a comparison between the contents of the shift register 166 and 8-bit byte of information received from the communications loop 100. Since information is continuously arriving at the BUS IN terminal 118 of the node 102 from the communications loop 100, flip-flop 182 must be reset at the beginning of each 8-bit byte of information received from the communications loop 100. Therefore, the function of the flip-flop 184 is to provide an indication of the results of the comparison for the previous byte of information.

To accomplish this, an analysis of the clock signals applied to the flip-flops 182 and 184 will be helpful. Note that the clock signal applied to the flip-flop 182 is the inverse of the clock signals applied to the flip-flop 184, the signal applied to the clock terminal of the latter flip-flop being a positive pulse. Since both flip-flops 182 and 184 are of the positive edge triggered type, flip-flop 184 will be triggered in accordance with the Q output of the flip-flop 182 before flip-flop 182 is reset.

As will become apparent, the function of flip-flops 182 and 184 will only be of importance when a read (BEX-2) or a write (OUT-2) instruction has been retrieved for execution by the communications processor 20. The rationale behind this is that the communications processor 20 only recognizes the existance of the node when either a read (BEX-2) or write (OUT-2) type operation is initiated. On the other hand, the node 102 serves as the interface between the communications loop 100 and the attached communications processor 20, and also maintains continuity within the communications loop 100. In this sense, the flip-flops 182, 184 must provide the information sufficient to maintain continuity for the communications loop 100, regardless of the status of an attached communications processor 20. To provide this continuity, the $\overline{Q}$ output of flip-flop 180 is provided as one input to a two-input AND gate 188. The other input to the AND gate 188 is from the $\overline{Q}$ output of flip-flop 184. The $\overline{Q}$ output of flip-flop 180 is the complement of the NRZ-Level representation of the modified Mauchly code of the present invention applied to the data terminal of the flip-flop 180. Since the output of the inverter 162 associated with the decoder 152 will be positive when either a read (BEX-2) or a write (OUT-2) instruction has been retrieved for execution by the attached communications processor 20, the output of the AND gate 186 will be a negative-going pulse at time $t_5$. As discussed, a negative-going pulse applied to the clear terminal of flip-flop 184 will always cause the $\overline{Q}$ output of the flip-flop 184 to be high. Thus, regardless of whether a comparison is achieved between the byte of information received from the communications loop 100 via the BUS IN terminal 118, the NRZ-Level representation of the byte of information signals from the $\overline{Q}$ output of the flip-flop 180 is gated by the AND gate 188 whenever a BEX-2 or an OUT-2 instruction is retrieved from memory 24.

Figure 14:
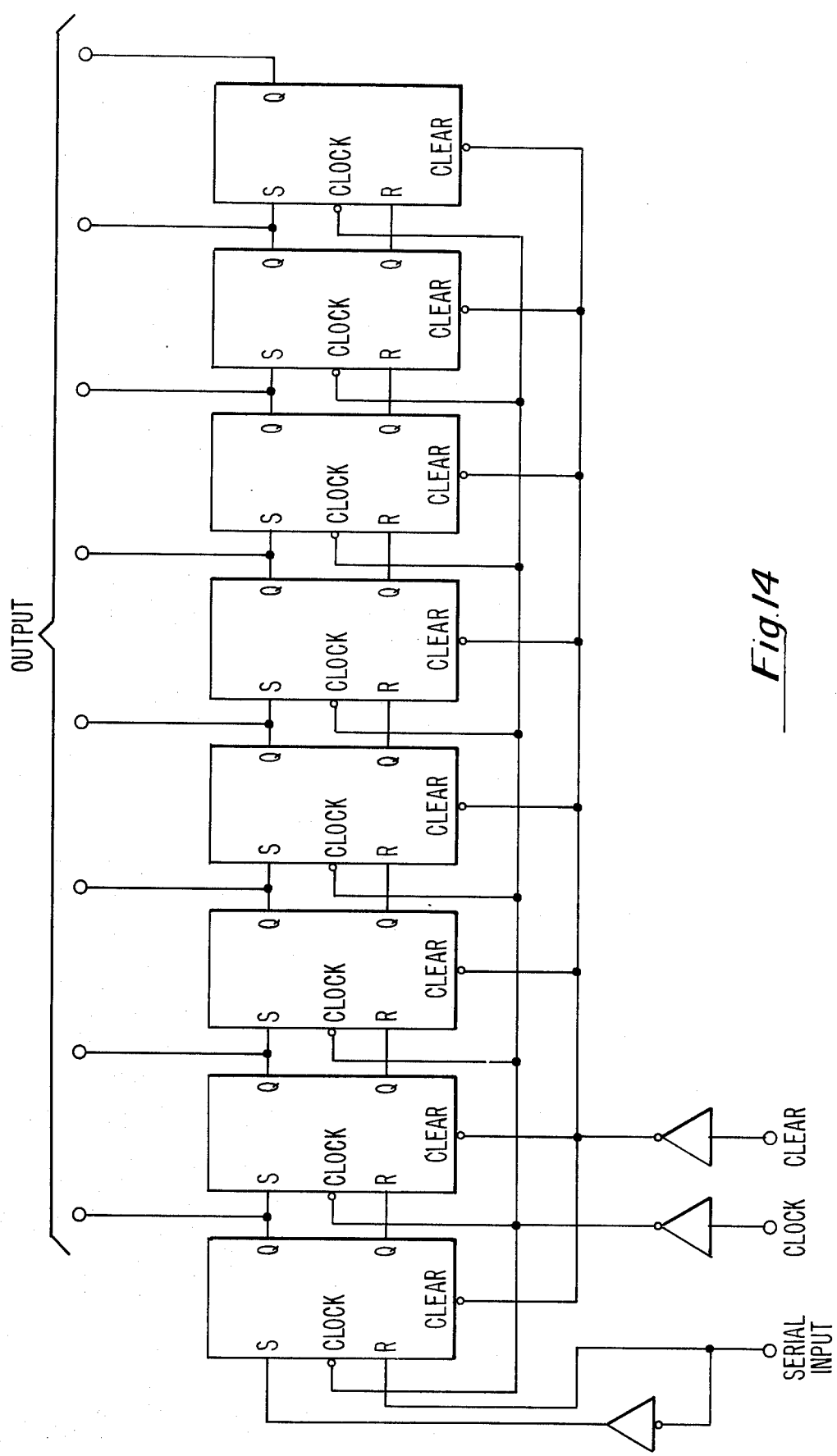
FIG. 14 is a logic diagram of a serial-in parallel-out shift register used in the node of FIG. 7.

The output of AND gate 188 is applied as one input to a two-input NOR gate 190, the output of which is applied to the serial-in terminal of the loop shift register 116. Loop shift register 116 is identical in structure with that of the shift register 166, and is also loaded in parallel from the output of the shift register 164. As discussed briefly, the function of the loop shift register 116 is that of a buffer. Specifically, as will be seen, the loop shift register 116, which is shown in FIG. 14, stores within the node 102 for a full eight clocks or bit periods, the information signals received from the communications loop 100. This eight bit delay is required to determine if there is a proper comparison between the signals stored in the shift register 166 and that which is received from the communication loop 100. As will be seen shortly, a comparison can only be achieved with information signals which are of the control type. Data type information signals are also compared with the contents of the shift register 166, however, no comparison can be achieved. Thus, when a comparison is achieved, as indicated by the Q output of the flip-flop 184, the contents of the loop shift register 116 must be control type information signals received from the communications loop 100.

To insure that only control type information bytes will result in a proper comparison, the serial-in terminal of the shift register 166 is tied to a negative potential. The shift register 166 is loaded at time $t_5$ with information provided by the attached communications processor, however, the first bit of information which will be compared will not occur until time $t_7$. Note that time $t_7$ occurs within the clock period for the first bit of non-identification information of the byte of information signal. Thus, the information loaded into the shift register 166 will not include information relating to the identification of the information bytes. Moreover, since in the preferred embodiment, the shift register 166 is only eight bits in length, while the bytes of information signals of the communications loop 100 are ten clock periods in length, there must be an allowance in the shift register 166 for the remaining two bits. To provide the shift register 166 with an additional two bit capacity, the serial-in terminal of the shift register is tied to a negative potential. Note, from Waveforms C and F that from time $t_5$ to a time $t_{10}$, the shift register 166 will have received seven clock pulses. After time $t_{10}$, but before the shift register 166 will again be parallel loaded with the contents of the shift register 166 at time $t_{13}$, the shift register 166 will receive one additional clock pulse at time $t_{11}$. At time $t_{10}$, however, the contents of the shift register 166 will be all ZERO's due to the tying of the serial-in terminal to a negative potential. When the shift register 166 receives a clock pulse at time $t_{11}$, the AND gates 174 and 176 will determine at time $t_{12}$ whether the binary value of of the next information signals bit is a ZERO. If it is a binary ZERO, then this would indicate that the preceding eight information bits were of the control type. Thus, the tying of the serial-in terminal of the shift register 166 to a negative reference potential will dictate that a correspondence can only be achieved with bytes of control type information signals.

If a read operation had been issued by the attached communications processor 20, then upon the proper comparison, the contents of the loop shift register 116 will be the processor identification number associated with the attached communications processor 20. If a write operation had been issued, then upon the proper comparison, the contents of the loop shift register will be all ZERO's.

Upon a proper comparison for a read operation, the processor identification number serially loaded in the loop shift register 116 from the output of the AND gate 188 and the NOR gate 190 must be changed to all ZERO's. This will allow other processors along the communications loop 100 the opportunity to write information onto the loop in the space previously containing unread information and prevent the same node from reading the same information over and over.

Upon comparison for a write operation, the ZERO's loaded in the loop shift register 116 must be changed to the identification number of the node designated to receive the information now to be written onto the communications loop 100. This new identification number, in turn, will be compared by other nodes along the communications loop 100, and will be accepted by the appropriate designated node. The designated node will, in turn, insert ZERO's in the control location and the cycle repeats itself.

To further appreciate the above, the function and operation of the loop shift register 116 and the shift register 164 will now be discussed in detail.

The clock signals for the loop shift register 116 are derived from the $\overline{Q}$ output of the monostable multivibrator 136. To provide the load pulses for the loop shift register 116, the output of a three-input NAND gate 192 is utilized. One input for the NAND gate 192 is from the output of the NAND gate 158, while a second input for the NAND gate 192 is from the Q output of the flip-flop 184. The third and final input to NAND gate 192 is from the output of the inverter 170. Since the output of the inverter 170 is the source of MCC pulses for the attached communications processor 20, it is obvious that the loop shift register 116 can only receive a negative load pulse during the time interval of an MCC pulse (assuming the other inputs to the NAND gate 192 are both positive at this time). Again, as with the AND gates 174 and 176, the input to the NAND gate 192 from the output of the NAND gate 158 will only be high when either a read (BEX-2) or a write (OUT-2) instruction has been retrieved for execution by the attached communications processor 20. Therefore, in order for a negative pulse to occur at the output of the NAND gate 192, the attached communications processor 20 must have implemented either a read or a write operation. Thus, whether a load pulse is supplied to the loop shift register 116 will be dependent upon the Q output of flip-flop 184. Moreover, it will only be necessary to examine the Q output of flip-flop 184 when a positive-going pulse is applied to its clear terminal from the output of the AND gate 186 at time $t_5$.

In this situation, the controlling variable is the signal level applied to the data terminal of flip-flop 184. This feature is illustrated by the truth table shown in FIG. 13. This signal level, in turn, is dependent upon the Q output of the flip-flop 182. As described above, the Q output of the flip-flop 182 will be negative when a comparison between the byte of information stored in the shift register 166 does not correspond to the byte of information received from the communications loop 100, via the BUS IN terminal 118. If, however, a proper comparison is achieved, the Q output of flip-flop 182 will be a positive level signal. Thus, the Q output of flip-flop 184 at time $t_5$ will be positive if the byte of information stored in the shift register 166 corresponds to the byte of information received from the communications loop 100 (as modified by the flip-flop 180). If the contents of the shift register 166 do not correspond with the information received from the communications loop 100, then the Q output of flip-flop 184 will be low and a load pulse for the loop shift register 116 will not be supplied.

For all other operations other than a read or a write operation, which are initiated by the attached communications processor 20, the output of the AND gate 186 will be a negative-going pulse. Therefore, regardless of the comparison performed by the exclusive-OR circuit comprised of AND gates 174, 176 and NOR gate 178, the Q output of the flip-flop 184 for these other operations will always be negative and no load pulse will be received by the loop shift register 116. Therefore, the loop shift register 116 can only be parallel loaded with the contents of the shift register 164 at time $t_5$ when either a read or a write operation has been specified by the attached communications processor 20, and when a proper comparison has been achieved. The importance of this feature will become more apparent in later discussions.

However, for the present it will be sufficient if it is understood that the contents of the shift register 163 can only be loaded into the loop shift register 116 when either a read or a write operation is initiated by the attached communications processor 20. Referring now more specifically to the shift register 164. As previously described, the shift register 164 is loaded serially from the output of the attached communications processor 20 via the DATA OUT terminal 82 of the coomunications processor 20. To insure that the information signals received from the DATA OUT terminal 82 of the processor 20 are loaded in the shift register 164 in synchronization with the clock of the attached communications processor 20, the clock pulses appearing at the CLOCK OUT terminal 53 of the attached communications processor 20 are provided as the clock pulses for the shift register 164 via an inverter 194. Thus, the same clock pulses which gate the information signals to the DATA OUT terminal 82 of the attached communications processor 20, also serially load the shift register 164.

Signals for clearing the contents of the shift register 164 are provided from the output of a three-input NAND gate 196. One input to the NAND gate 196 is connected to the Q output of the flip-flop 184 while another input to the NAND gate 196 is connected to the output of the inverter 150. The third input into NAND gate 196 is from the output of the inverter 170, which is the source of MCC pulses for the attached communications processor 20. Since the output of the inverter 150 will only be high when a BEX-2 operation is decoded by the decoder 152, it is apparent that the output of the NAND gate 196 can only provide a clear pulse for shift register 164 when a BEX-2 operation has been initiated by the attached communications processor 20. As discussed earlier, for operations other than a BEX-2 or OUT-2, which are implemented by the attached communications processor 20, the Q output of the flip-flop 184 must be a low level signal in order for the output of the NAND gate 196 to be positive. Moreover, the clear pulse for the shift register 164 can only occur at time $t_5$, which coincides with the occurrence of an MCC pulse provided at the output of the inverter 170. Therefore, the Q output of the flip-flop 184 is the controlling variable in determining whether a clear pulse for the shift register 164 will be provided by the output of the NAND gate 196.

It should be remembered that prior to the initiation of a BEX-2 operation for the attached communications processor 20, which is in response to a request from a device 10 or a processor 12, that the communications processor 20 executed an operation which serially loaded the shift register 164 with the processor identification number. This information was supplied to the shift register 164 via tne DATA OUT terminal 82 of the attached communications processor 20. At the generation of the LAST PULSE by the communications processor 20 for this operation, the next instruction retrieved and loaded into the information register 99 of the communications processor 20 will be the BEX-2 instruction. However, due to the operation of the LAST PULSE, the communications processor 20 must await the arrival of an MCC pulse from the node 102 before the BEX-2 instruction can be executed by the communications processor 20. On the other hand, irrespective of the existence of the LAST PULSE, the A, B, N9 and N10 control signals, which are supplied to the decoder 152, indicate that the communications processor 20 is prepared to implement a BEX-2 operation. At the occurrence of the next successive MCC pulse, the output of the AND gate 186 will be a positive-going pulse due to the output of the inverter 162. Since the clear pulse for the flip-flop 184 is a positive-going signal, the Q output of the flip-flop 184 will now depend upon the signal level at its data terminal. The importance of the clock signals for the flip-flops 182 and 184 should now be apparent. Even though the signal level applied to the data terminal of flip-flop 182 has changed from a low level to a high level signal upon the generation of the LAST PULSE by the communications processor 20, the output of the flip-flop 182 will represent the low signal level condition until a clock pulse is received. But since the flip-flop 182 will not receive a clock pulse until after flip-flop 184 receives a clock pulse, the outputs of the flip-flop 184 will indicate the condition of the flip-flop 182 during the previous MCC clock. In the present case, the Q output of the flip-flop 182 will always be low, irrespective of the comparison performed by the AND gates 174 and 176 and the NOR gate 178, between the contents of the shift register 166 and the information received from the communications loop 100. If there is a proper comparison, the Q output of the flip-flop 182, which was set by the last previous MCC pulse, would follow the negative signal level applied to the data terminal of flip-flop 182 from the output of the NOR gate 158. On the other hand, if no comparison is achieved, a low level pulse would have been supplied to the clear terminal of flip-flop 182, which in turn, would have caused the Q output of flip-flop 182 to go low, regardless of the signal level applied to the data terminal of flip-flop 182. Thus, the Q output of the flip-flop 182 just prior to the occurrence of an MCC pulse, which will initiate a BEX-2 operation for the attached communications processor 20, will always be low. At the occurrence of an MCC pulse at time $t_5$, the output of the AND gate 186 will be a positive-going pulse. Therefore, the Q output of the flip-flop 184 will follow the low level signal supplied from the Q output of flip-flop 182. As a result, the output of NAND gate 196 will remain high and no clear pulse will be supplied to the shift register 164. Thus, the contents of the shift register 164 will remain unchanged until a clear pulse can be provided as a result of a proper comparison.

In order, however, for a new comparison to be performed, the shift register 166 must again be parallel loaded with the contents of the shift register 164, which has remained unchanged. Since the BEX-2 operation has not been implemented, the output of the decoder 152 remains unchanged. As a result, at time $t_5$, the output of the NAND gate 172 will go low, thereby providing a load signal for the shift register 166. Upon the loading of the shift register 166, and the provision of clock pulses to the flip-flop 180, the AND gates 174, 176, and the shift register 166, the comparison will again be attempted. This process will repeat itself until a comparison is finally achieved, or an interrupt has been initiated.

Upon the determination of a proper comparison for a BEX-2 operation, clock pulses must again be permitted to flow to the attached communications processor 20. Thus, if no clear pulse is received by the flip-flop 182, which would indicate that there is correspondence, the occurrence of the next MCC pulse at time $t_5$ would cause the $\overline{Q}$ output of the flip-flop 184 to switch low. This low level signal is supplied as one input into a two-input NOR gate 198. The other input to the NOR gate 198 is for providing an interrupt signal, which would remove the clock inhibit to the attached communications processor 20. This feature was described earlier. In the preferred embodiment, the interrupt signal is assumed to be a positive level signal. The output of the NOR gate 198 is supplied as one input into a two-input AND gate 200. The other input to the AND gate 200 is from the Q output of the monostable multivibrator 138, which is the source of clock pulses for the attached communications processor 20. The output of the AND gate 200, and the output of the AND gate 160 are provided as inputs to an OR gate 202. It is the output of the OR gate 202 which is connected to the CLOCK IN terminal 48 of the attached communications processor 20.

Thus, when the $\overline{Q}$ output of the flip-flop 184 switches low, indicating a comparison has been achieved, the output of the NOR gate 198 switches high. This, in turn, will allow AND gate 200 to gate clock pulses from the Q output of monostable multivibrator 138 to the attached communications processor 20. Upon receipt of clock pulses, the attached communications processor 20 will execute the instruction specified in its instruction register 99. If the instruction was a BEX-2 operation, information signals from the communications loop 100 would be gated via AND gate 148 and NOR gate 144 to the DATA IN terminal 80 of the attached communications processor 20. On the other hand, if the instruction was an OUT-2 operation, data signals from the DATA OUT terminal 82 will be gated onto the communications loop 100 via the loop shift register 116.

To perform the gating of data signals from the device 10 or processor 12 via the attached communications processor 20 onto the communications loop 100, a flip-flop 204 is employed. The flip-flop 204, shown in FIG. 15, is similar in structure to that of flip-flop 124, except that a preset function is included. A truth table for flip-flop 204 is shown in FIG. 16. The data terminal of flip-flop 204 is connected to the DATA OUT terminal 82 of the attached communications processor 20, while the clock terminal of flip-flop 204 is connected to the CLOCK OUT terminal 53 of the attached communications processor 20. Preset signals for the flip-flop 204 are provided from the output of the NAND gate 168. The Q output of the flip-flop 204 is provided as one input to a two-input AND gate 206. The other input to the AND gate 206 is from the Q output of the flip-flop 184. The output of the AND gate 206 is provided as the second input to the NOR gate 190, which was mentioned earlier.

When the attached communications processor 20 begins to receive clock pulses from the node 102, CLOCK OUT pulses from the attached communications processor 20 will be supplied to the clock terminal of the flip-flop 204. The MCC pulse at time $t_5$ which removed the clock inhibit to the attached communications processor 20 also will preset the Q output of the flip-flop 204 to a high level. Thereafter, upon receipt of the positive edge of a CLOCK OUT pulse from the attached communications processor 20, the Q output of the flip-flop 204 will follow the signal level at its data terminal. This output will be gated by AND gate 206 and NOR gate 190 to the serial-in terminal of the loop shift register 116. Note that in the execution of an OUT-2 operation, the AND gate 188 is inhibited from gating information signals from the communications loop 100 to the serial-in terminal of the loop shift register 116 once a comparison is achieved. Instead, AND gate 206 is activated once a comparison is achieved.

Upon the completion of the OUT-2 operation, a LAST PULSE is internally generated by the attached communications processor 20, and the next instruction to be executed is retrieved from memory 24 of the attached processor 20 and loaded into the instruction register 99. If this new instruction is neither a BEX-2 nor an OUT-2 instruction, the node simply becomes a source of clock pulses and MCC pulses for the attached communications processor 20 and a buffer (in the form of shift register 164) for data signals supplied by the DATA OUT terminal 82 of the attached communications processor 20. The attached communications processor 20 will continue to retrieve and execute instructions until either another BEX-2 or OUT-2 instruction is retrieved. Upon that occurrence, the node 102 will implement the appropriate operation which have been described.

The remaining section, which will now be described, is the output section 114 of the node 102. As briefly discussed, the output section 114 must recombine timing with information, so that the format of information signals placed back on the communications loop 100 has not been altered, aside from the delay inserted by the loop shift register 116, and the logic of the node 102. In addition, in the preferred embodiment, when a communications processor 20 is not attached to the node, the node 102 is designed to function as a repeater. In this repeat mode, signals received from the communications loop 100 are reshaped and amplified.

Figures 8, 9:
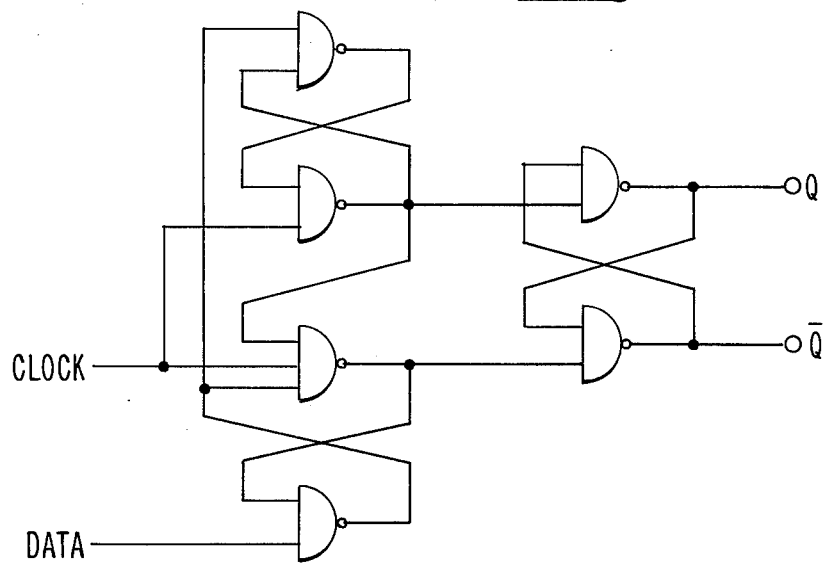
FIG. 8 is a logic diagram of a flip-flop used in the node of FIG. 7.
FIG. 9 is a truth table for the flip-flop of FIG. 8.
Figures 17, 18:
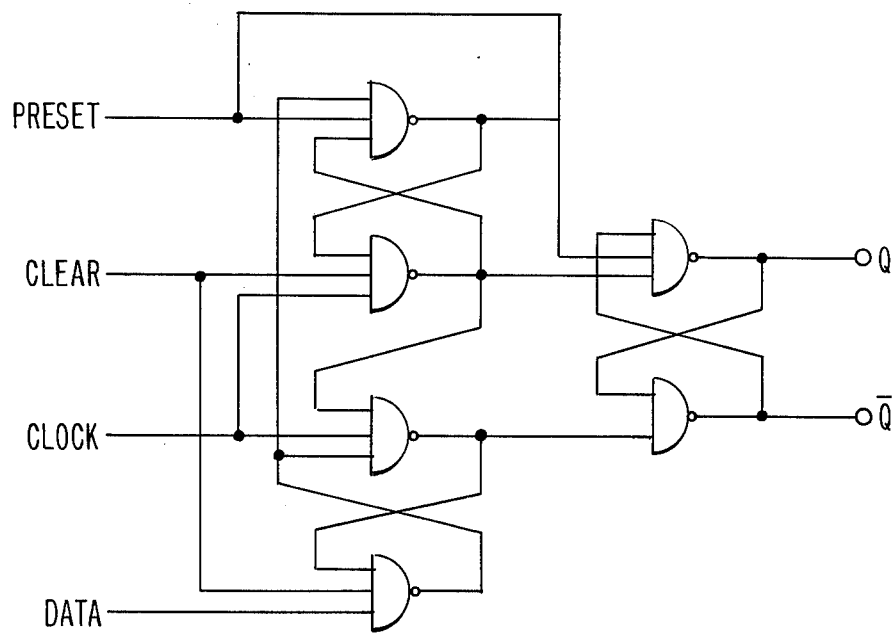
FIG. 17 is a logic diagram of a flip-flop used in the node of FIG. 7.
FIG. 18 is a truth table for the flip-flop of FIG. 17.

In the preferred embodiment, to implement the recombining function mentioned above, the serial output of the loop shift register 116 is applied as one input to a two-input AND gate 208. The other input to the AND gate 208 is from a repeat control 210, which ordinarily is a constant source of positive potential. The repeat function is implemented by connection of the BUS IN terminal 118 to one input of a two-input AND gate 212. The other input to the AND gate 212 is from the repeat control 210 via an inverter 214. Both the outputs of the AND gates 208 and 212 are connected as inputs to a two-input NOR gate 216, the output of which is connected to the data terminal of a flip-flop 218. Flip-flop 218 is identical in structure to that of flip-flop 124, which is shown in FIG. 8. Clock signals for the flip-flop 218 are provided by the $\overline{Q}$ output of the monostable multivibrator 136. The Q output of the flip-flop 218 is connected as a one input to a two-input NAND gate 222. The second input for both the NAND gates 220 and 222 is from the Q output of monostable multivibrator 140. The output of the NAND gate 222 is connected to the preset terminal of a flip-flop 224, while the output of the NAND gate 220 is connected to the clear terminal of the flip-flop 224. Connected to the clock terminal of flip-flop 224, which is shown in FIG. 17, is the $\overline{Q}$ output of the monostable multivibrator 136. The $\overline{Q}$ output of the flip-flop 224 is connected to a BUS OUT terminal 226. A truth table for flip-flop 224 is shown in FIG. 18. The BUS IN terminal 118 and the BUS OUT terminal 226 are the two serial connections for the node 102 with the communications loop 100.

When the node is not in a repeat mode, the bias created by the inverter 214 prevents the AND gate 212 from gating information signals received from the communications loop 100 directly to the BUS OUT terminal 226. When the node is in a repeat mode, the loop shift register 116 is by-passed and thus, the delay associated with the loop shift register is avoided. As can be apparent, the repeat control w10 must provide a source of negative potential when the node is to be in the repeat mode. However, when the node is not in the repeat mode, the information signals received from the communication loop 100 must pass through the loop shift register 116 and be gated by the AND gate 208 and the NOR gate 216 to the data terminal of flip-flop 218.

The function of the flip-flop 218 is to provide a one clock or bit period delay. As will be seen this delay will only be effective with signals received from the loop shift register 116 via the AND gate 208 and the NOR gate 216. Information signals received from the communications loop 100 which by-pass the loop shift register 116, are only delayed by approximately three-fourths of a bit or clock period. This three-fourths of a bit or clock period delay is the result of utilizing the $\overline{Q}$ output of monostable multivibrator 136 as the clock signal for the flip-flop 218. These two delays serve different purposes. When the node is in the repeat mode, the three-fourths of a bit period delay provides the node with sufficient time to reshape and amplifly the information signals received from the communications loop 100. When the node is not in the repeat mode, the one bit or clock period delay is necessary to insure that there is a signal level transition at the end of every clock period except during information signal type identification.

The function of these two delays can be more clearly illustrated from a careful analysis of the various waveforms of FIG. 6. Waveform A illustrates a typical sequence of information signals and their respective identification portions. Note, that in the preferred embodiment, a byte of control information is followed by a byte of data information, where each byte of information is ten clock periods in length (two for identification and eight for information). Note also, that there is a signal level transition at the end of each clock period except for the first clock period of the byte. There may be a signal level transition within the interval of the first clock or bit period of the byte, but not at the end of the first clock or bit period of the byte. From these information signals illustrated in Waveform A, the AND gates 128, 130, the NOR gate 132, and the flip-flop 124 generate a train of pulses illustrated as Waveform B. Note that the occurrence of a pulse in the Waveform B coincides with the occurrence of a signal level transition in Waveform A. From the pulses of Waveform B, the NAND gate 134 and the monostable multivibrator 136 provide a train of pulses illustrated as Waveform C. Note that once the node is synchronized to the information signals on the communications loop 100, the monostable multivibrator 136 will eliminate those pulses of Waveform B which coincide with signal level transitions occurring within a clock period. Note also, that a byte of pulses of Waveform C that correspond with a byte of data information of Waveform A is identical to a byte of pulses of Waveform C which correspond with a byte of control information of Waveform A. In addition, note that a byte of information signals is now represented by a series of nine equally spaced pulses. From these series of nine equally spaced pulses of Waveform C, the monostable multivibrator 138 provides a train of pulses illustrated as Waveform D. It is these pulses to Waveform D which are provided as clock pulses for an attached communications processor. The inverse or complement of Waveform D is illustrated as Waveform E. Note that each byte of pulses is now a series of nine uniform (square wave) pulses in which each series is separated by a time interval of approcimately one and one-half clock period duration. From the train of pulses of Waveform E, the monostable multivibrator 140 provides a train of pulses illustrated as Waveform F. Similarly, from the train of pulses of Waveform D, the monostable multivibrator 142 provides a train of pulses illustrated as Waveform G. Note that the train of pulses illustrated as Waveform F is identical in shape to the train of pulses illustrated as Waveform G. The difference between these two trains is one of phase relationship only. In the preferred embodiment, these two pulse trains should differ in phase by approximately one-half of a clock period. Also note, that each of these two trains is comprised of a series of shorter pulse trains, where each of the shorter pulse trains is a series of nine equally spaced pulses of short duration.

From the train of pulses illustrated as Waveform G and that of Waveform F, the NAND gate 168 and the inverter 170 provide a train of pulses illustrated as Waveform H. It is the pulses of Waveform H which are provided as MCC pulses for the attached communications processor 20. Note, that the occurrence of a pulse in Waveform H always coincides with the occurrence of an identification pulse in Waveform A.

In the preferred embodiment, it is from the signal level transitions which occur at the beginning of every clock period that the clock pulses for the node and attached communications processor are derived. Note, however, that while the signal level transition occurs at the beginning of the clock period, it is not until after half the clock period has expired before a determination can be made as to the binary value of the signal for that particular clock period. This is a feature of the Mauchly code. Thus, the function of the monostable multivibrator 136 is to not only eliminate the pulses of Waveform B, which result from signal level transitions within the clock period, but also to delay the clock which is generated by the node, so that it can occur with the occurrence of the portion of the information which is value determining. The combining of this delayed clock signal with the binary value determining portion of the information signal is performed by the flip-flop 180. The pulses of Waveform A are provided as the data input for flip-flop 180, while the pulses of Waveform C are provided as the clock for the flip-flop 180. The resulting Q output of flip-flop 180 is illustrated as Waveform J.

As will be apparent from the following discussion, the flip-flop 180, the loop shift register 116 and the flip-flop 218 will delay the information signals received from the communication loop by approximately ten and three-fourths clock periods. As shown in FIG., the loop shift register 116 is clocked on the raising edge of pulses applied to its clock terminal. Thus, for purposes of illustration, assume the leading edge of byte of control information signals received at the BUS IN terminal 118 begins at time $t_{14}$. At a time $t_{15}$, as shown in FIG., approximately three-fourths of a clock period after time $t_{14}$, the leading edge of the byte of control information signals (modified by the flip-flop 180) will appear at the output of the flip-flop 180. This three-fourths of a clock period delay is a result of employing the output of monostable multivibrator 136 as the clock for the flip-flop 180. The leading edge of the byte of control information will not be clocked into the loop shift register 116 until the next raising edge of a pulse from the output of the monostable multivibrator 136 occurs. As illustrated in Waveform C, the next raising edge occurs at time $t_{16}$. Note, the time duration between time $t_{16}$ and time $t_{15}$ is approximately equal to two clock periods. The leading edge of the byte of control information will not appear at the serial-out terminal of the loop shift register 116 until seven additional clock pulses are received by the loop shift register 116. This situation will not occur until time $t_{17}$, which is illustrated in Waveform C. Time $t_{17}$ occurs approximately nine and three-fourths clock periods after the leading edge of the byte of control information appears at the BUS IN terminal 118 at time $t_{14}$. At time $t_{17}$, the leading edge of the byte of control information signals will also be applied to the data terminal of the flip-flop 218. Concurrently, the clock terminal of flip-flop 218 will receive a clock pulse at time $t_{17}$. Since, in the preferred embodiment, the flip-flop 218 is a D-type flip-flop, the level of the signal applied to its data terminal just prior to the receipt of a clock pulse will determine the level of the signal at the output of the flip-flop 218. Thus, the leading edge of the byte of control information signals will not appear at the output of the flip-flop 218 until approximately ten and three-fourths clock periods have expired from time $t_{14}$.

Summarizing as a result of using the output of monostable multivibrator 136 as the clock for flip-flop 180, the output of flip-flop 180 is approximately three-fourths of a clock period out of phase with the signals applied to the data terminal of the flip-flop 180. When the $\overline{Q}$ output of the flip-flop 180, which is illustrated as Waveform I, passes through the loop shift register 116, which in the preferred embodiment is eight bits in length, an additional nine clock period delay is encountered. Thus, when the output of flip-flop 180 finally arrives at the data terminal of the flip-flop 218, each pulse has been delayed by approximately nine and three-fourths clock periods. Passage of information signals from the loop shift register through the flip-flop 218 will add an additional clock period delay. The Q output of flip-flop 218 is illustrated as Waveform K.

However, if the information signals received from the communications loop 100 by-pass the loop shift register 116 in reaching the data terminal of the flip-flop 218, via the AND gate 212, only three-fourths of a clock period delay will be encountered. In this situation, the flip-flop 218 operates on the information signals received from the communications loop 100 in a manner identical to that of the flip-flop 180. Thus, when the node 102 is in the repeat mode, the information signals are delayed by approximately three-fourths of a clock period.

Figure 19:
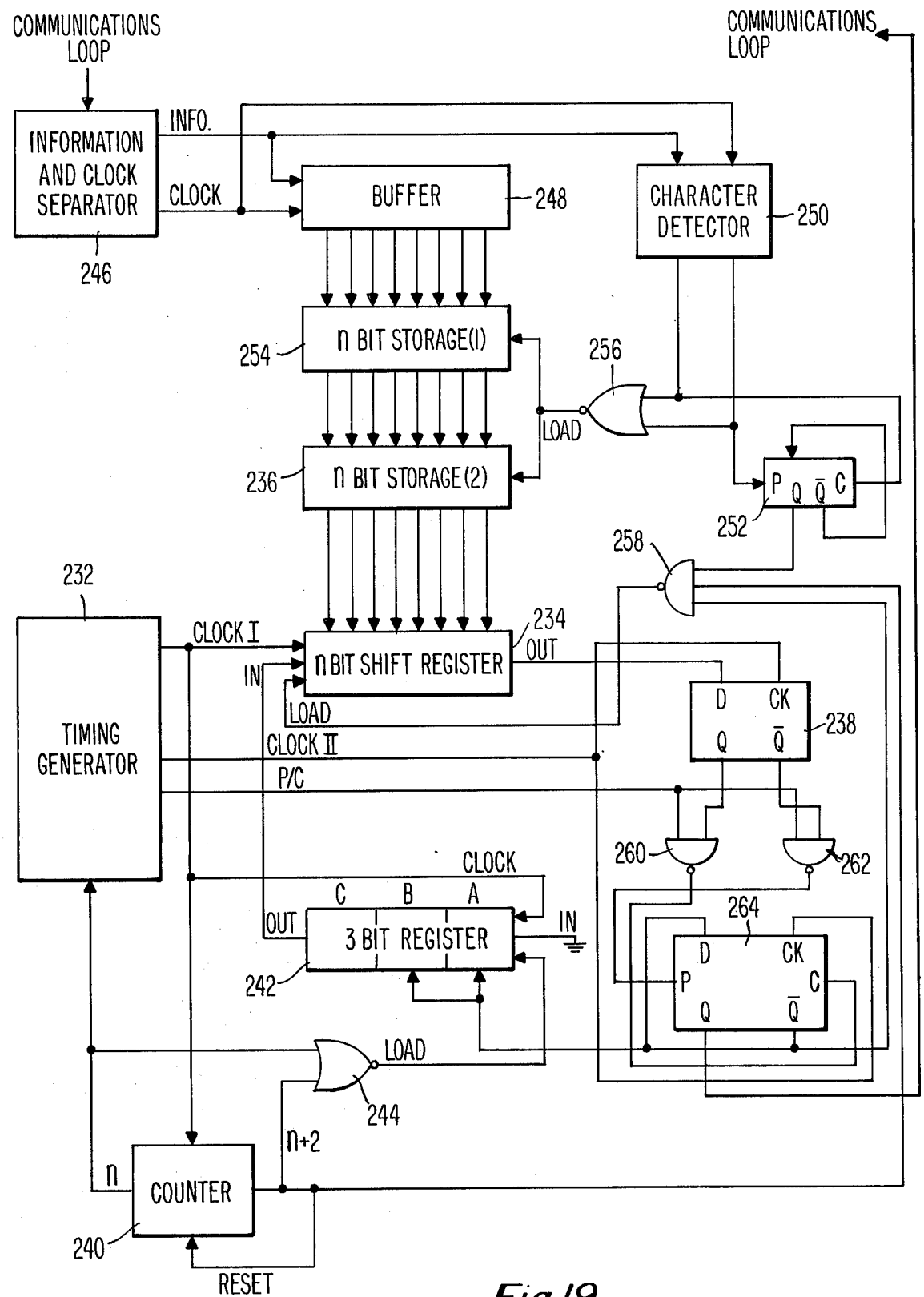
FIG. 19 is a logic block diagram of a synchronizer used in the communications system of FIG. 1.

Irrespective of whether the node 102 is in a repeat mode, analysis of the Waveform K will reveal that the output of flip-flop 218 is the NRZ-Level representation of the information signals received from the communications loop 100. To restructure the NRZ-Level representation of the information signals to the modified Mauchly format, the NAND gates 220, 222 and the flip-flop 224 are employed. The output of NAND gate 220, which is illustrated as Waveform L, will provide signal level transitions within the clock period for representing a binary ZERO, while NAND gate 222 will provide signal level transitions within the clock period for representing a binary ONE. The output of NAND gate 222 is illustrated as Waveform M. Flip-flop 224 will insure that there is a signal level transition at the beginning of every bit or clock period. Since, in the preferred embodiment, there will be no signal level transition at the beginning of the second bit or clock period in each byte of information signals received from the communications loop 100, flip-flop 224 must also Associated with each communications loop 100 of FIG. 1 is a loop controller or synchronizer 230. The function of the synchronizer 230 is to generate the modified Mauchly format of the data and control characters, and to synchronize these characters as they circulate around the communications loop 100. A functional block diagram of a synchronizer 230 is shown in FIG. 19. Included as an element of each synchronizer 230 is a timing generator 232. In the preferred embodiment, the timing generator 232 is a source of clock pulses from which are derived clocks for the communications loop 100. The timing generator 232 is designed to provide a plurality of different clock pulse times, each of which being described later.

To establish a communications loop 100, the synchronizer 230 provides a train of alternating control and data characters. In the preferred embodiment, when the loop is first implemented, the information portion of these characters should all be zeros. This will permit any computer, terminal or device 10 attached to the communications loop the ability to place information on the loop for communication. In this situation, all control characters will indicate that space is available for writing information onto the communications loop. To set up the communications loop in this manner, a N-bit shift register 234 is provided. The shift register 234 is of the parallel in serial out type with the ability of also being serially loaded. The shift register 234, which is similar in structure to that of shift register 166, is parallel loaded from the output of a storage register 236, and is serially loaded from the output of a three bit shift register 242.

Figure 20:
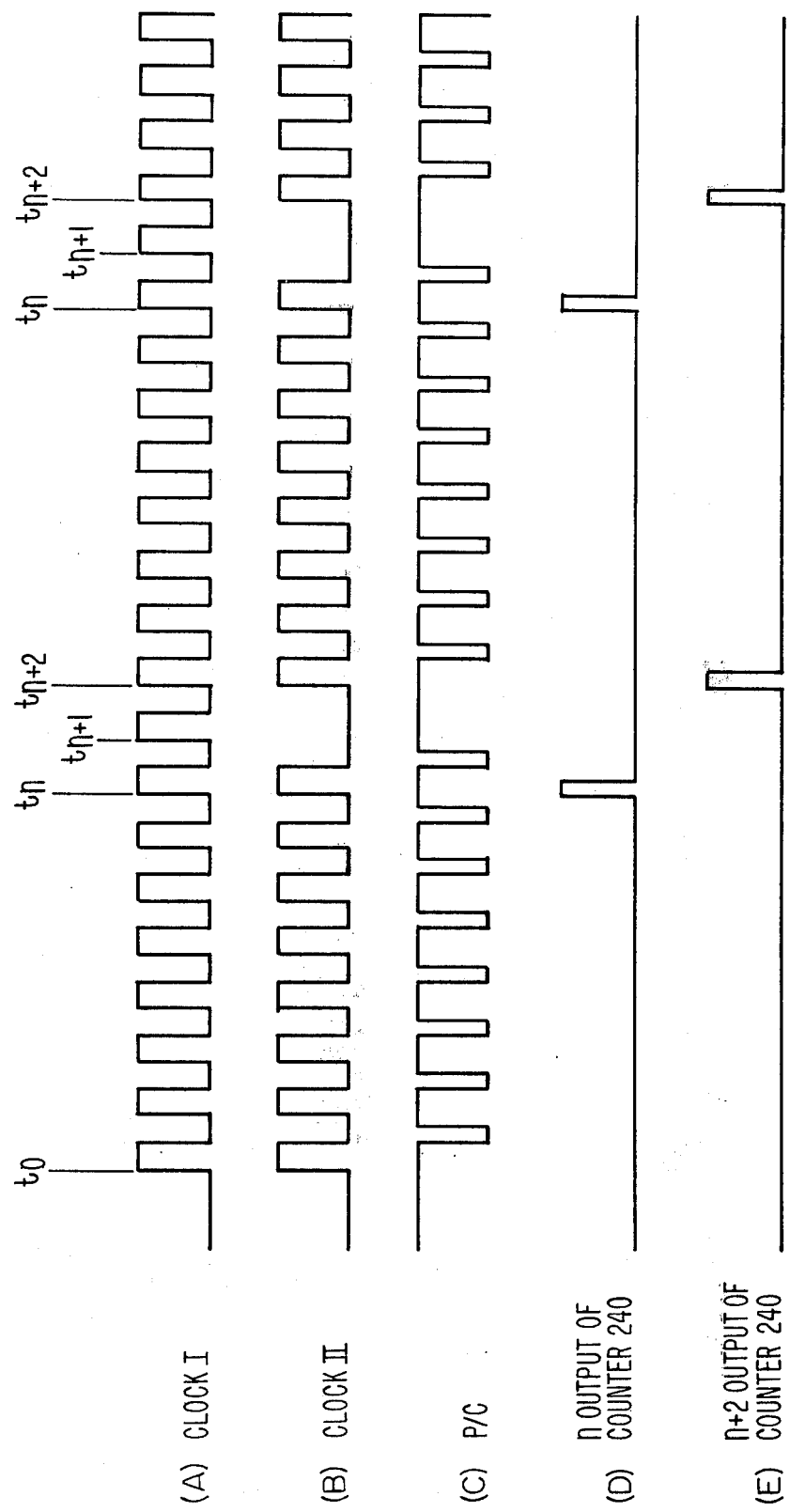
FIG. 20 shows signal waveforms for illustrating the operation of the synchronizer of FIG. 19.

The serial output of the shift register 234 is applied to the data terminal of a flip-flop 238. Clock pulses for the shift register 234 (CLOCK I) and for the flip-flop 238 (CLOCK II) are provided by the timing generator 232. The CLOCK II pulses for the flip-flop 238 are at the same frequency and in phase with the CLOCK I pulses applied to the shift register 234. Preset and clear signals for the flip-flop 238 are also derived from timing signals provided by generator 232. These preset and clear signals along with the CLOCK I and II signals supplied by the timing generator 232, are designed to provide the signal level transitions which are required to conform to the modified Mauchly format of the present invention. In the preferred embodiment and as shown in FIG. 20, preset and clear signals are designed to occur in the middle of the clock period of the clock pulses applied to the clock terminal of flip-flop 238.

The Q output of flip-flop 238 is connected as one input to a two-input NAND gate 260. Similarly, the $\overline{Q}$ output of the flip-flop 238 is connected as one input to a two-input NAND gate 262. The remaining input to both NAND gates 260, 262 is from the timing generator 232. This timing signal is referenced as P/C in FIG. 19. Waveforms representing CLOCK I, CLOCK II and the input (P/C) to the NAND gates 260, 262 from the timing generator 232 are illustrated as Waveforms A, B, and C, respectively, in FIG. 20. The output of NAND gate 260 is applied to the clear terminal of a flip-flop 264, while the output of the NAND gate 262 is applied to the preset terminal of flip-flop 264. Clock signals for the flip-flop 264 are also provided by the CLOCK II signals of the timing generator 232. The $\overline{Q}$ output of flip-flop 264 is applied as the input to the data terminal of flip-flop 264, while the Q output is connected to the communications loop 100. This connection is one of the two connections between the communications loop 100 and the synchronizer 230.

To provide the missing signal level transition which occurs only in the identification portion of each character, a counter 240 is provided. CLOCK I pulses (Waveform A of FIG. 20) from the timing generator 232, which are appled to the shift register 234 are also applied to the counter 240. The counter 240, in turn, will count the clock pulses received from the timing generator until a count of $n$ is reached, where $n$ is the number of bits per data or control character. Upon reaching the required count, the counter will provide a signal to the timing generator 232 which will provide a signal to the timing generator 232, which will inhibit all CLOCK II pulses as well as preset and clear pulses from being supplied to the flip-flops 238 and 264 during the time interval between the $n^{th} + 1$ and $n^{th} + 2$ clock pulses, to include the beginning of the $N^{th} + 1$ clock pulse but not including the beginning of the $n^{th} + 2$ clock pulse. In the preferred embodiment $n = 8$.

To insure that there will always be alternating data and control characters, the $\overline{Q}$ output of flip-flop 264 is also applied as parallel inputs to two (A and B) of the three flip-flops of the shift register 242. Clock pulses for the three-bit shift register 242 are identical to those (CLOCK I) applied to the n-bit shift register 234. The three-bit shift register 242 is always serially loaded when clocked from a constant source of logical ZEROs. Load signals for parallel-loading the three-bit shift register 242 are provided by the output of a two-input NOR gate 244. Both inputs to the NOR gate 244 are provided by the counter 240 (see Waveforms D and E of FIG. 20). As previously discussed, the counter 240 provides a signal (Waveform D) once a count of $n + 2$ is reached. In addition, the counter 240 provides a signal (Waveform E) once a count of $n$ is reached. It is both these signals from the counter 240 which are supplied as inputs to the NOR gate 244. In the preferred embodiment, the counter 240 is designed to generate these signals so that they occur between the time interval of the occurrence of the CLOCK I (Waveform A) pulse from the timing generator 232 and the occurrence of a preset or clear pulse (Waveform C), also provided by the timing generator 232. Thus, the first two flip-flops (identified as A and B in FIG. 19) of the three-bit shift register 242 are parallel loaded shortly after the occurrence of the $n^{th}$ and $n^{th} + 2$ clock pulses. The counter is reset upon reaching a count of $n + 2$, and the clock inhibits to the flip-flops 238 and 264 are removed.

To illustrate the operation and relationship between the various elements of the synchronizer 230 described thus far, assume that power has just been applied to the synchronizer 230. In addition, assume that the application of power to the synchronizer 230 clears the n-bit shift register 234 and the three-bit shift register 242. Further, the operation of flip-flop 238 and flip-flop 264 and NAND gates 260, 262 are identical to that of flip-flops 218, 224 and NAND gates 220, 222 found in the output section 114 of a node 102. Therefore, further discussion as to the operation of flip-flops 238, 264 and NAND gates 260, 262 will not be made. Thus, as the first clock pulse is applied to the shift register 234 at time $t_0$ as shown in FIG. 20, the same clock pulse is also being supplied to the three-bit shift register 242. In response to this first clock pulse, a logical ZERO is applied to the data terminal of the flip-flop 238, and the shift register 234 is serially loaded with the output of the last flip-flop (flip-flop C) of the three-bit shift register 242, which in this case, is also a logical ZERO. However, since a load pulse will not be provided to the three-bit shift register 242 until after $n$ clock pulses have been counted by the counter 240, the $\overline{Q}$ output of the flip-flop 264 cannot be parallel loaded into the first two flip-flops of the three-bit shift register 242 at this time. Instead, the first or (A) flip-flop of the three-bit shift register 242 will be serially loaded with a logical ZERO. Identical actions will occur with the occurrence of successive clock pulses until a count of $n$ is reached by the counter 240. Upon the occurrence of the $n^{th}$ clock pulse the fliip-flop 264 will be set according to the signal level at its data terminal. However, before a preset or clear pulse will be received by the flip-flop 238, the first two flip-flops (A and B) of the three-bit shift register 242 will be set to a logical state in accordance with the $\overline{Q}$ output of the flip-flop 264 which has just been set by the $n^{th}$ clock pulse. In the specific example above-described, the $\overline{Q}$ output will be a logical ONE. Upon the occurence of the $n^{th} + 1$ clock pulse, and until but not including the occurrence of the $n^{th} + 2$ clock pulse, the clock signals and all preset and clear signals to the flip-flops 238 and 264 are inhibited. However, clear or present signals to the flip-flop 264 are not inhibited until but not including the $n^{th} + 1$ clock pulse. Thus, any signal level transitions which may occur in the first clock period of the identification portion of a character will not be eliminated.

Upon the occurrence of the $n^{th} + 1$ clock pulse, clock signals will only be supplied to the n-bit shift register 234, the counter 240, and the three-bit shift register 242. Thus, with the situation described above, another logical ZERO will be supplied to the data terminal of flip-flop 238, a logical ONE will be serially loaded into the n-bit shift register 234, and a logical ZERO will be serially loaded into the first or A flip-flop of the three-bit shift register 242. Upon the occurrence of the $n^{th} + 2$ clock pulse, the $\overline{Q}$ output of the flip-flop 238 will again be set according to the signal level at its data terminal and before a preset or clear pulse will be received by the flip-flop 264, the just changed $\overline{Q}$ output of flip-flop 238 will be parallel loaded into the first two flip-flops (A and B) of the three-bit shift register 242.

As should be seen from the above, the function of the three-bit shift register 242 is to store a representation of the identification portion of the most recent character placed on the communications loop by the synchronizer. This feature can be seen from a review of the contents of the three-bit shift register shortly after the initation of the $n^{th}$, $n^{th} + 1$ and $n^{th} + 2$ clock pulses. The contents of the three-bit shift register are (in ABC order) $\overline{n}, \overline{n}, O; O, \overline{n}, \overline{n};$ and $\overline{n+2}, \overline{n+2}, \overline{n},$ respectively for these times. By employing the $\overline{Q}$ output of the flip-flop 238, whatever character identification is represented by the contents of the last two flip-flops will be complemented $n + 2$ clock pulses later. This will insure that there is always a train of alternating data and control characters.

Addressing now the problem of recirculating the characters once they have traversed the communications loop associated with the synchronizer, the remaining elements and function of the synchronizer will now be described. Signals from the communications loop are provided as an input to a information and clock separator 246. This connection to the communication loop constitutes the other physical interface between the communications loop 100 and the synchronizer 230.

The information and clock separator 246 of the synchronizer 230 is identical in structure and function to that of the input section 106 of a node 102. Separated information signals are provided as a serial input into a n-bit buffer 248. The n-bit buffer 248 is of the serial-in parallel-out type. These separated information bits are clocked in by the separated clock pulses also provided by the information and clock separator 246. To synchronize to the character, a character detector 250 is provided. The function of the character detector is to determine when a character begins and ends and the type of character. To perform this function, the character detector 250 compares the time interval between clock pulses which are provided by information and clock separator 246. Upon the detection of a missing clock pulse, it will indicate that the next $n$ clock pulses to follow will all be associated with information signals as opposed to identification signals. In addition, the character detector 250 will compare the signal level of the information signal just preceding the missing clock pulse and the signal level of the information signal shortly after the occurrence of the first clock pulse immediately following the missing clock pulse. By comparison of these two signal levels, a determination is made as to whether the following eight information bits are of the data or control type. A flip-flop 252 is provided for the purpose of recording this determination.

Since the generation of data and control characters by the combination of the flip-flops 238, 264, the three-bit shift register 242, the n-bit shift register 234 and the counter 240 is independent of characters received from the communications loop by the information and clock separator 246, provisions have been made to insure that the Q output of the flip-flop 238 will always be a steady uninterrupted stream of alternating data and control characters. These provisions are partly in the form of two n-bit storage registers 254 and 236, the latter being mentioned earlier. The n-bit storage registers 254 and 236 are of the parallel-in parallel-out type. The storage register 254 is parallel loaded with the output of the n-bit shift register 248, while the n-bit storage register 236 is parallel loaded with the output of the n-bit storage register 254.

To provide load signals for the n-bit storage registers 254 and 236, the outputs of the character detector 250 are utilized. The character detector will provide a first signal if a control character is detected and a second signal if a data character is detected. These two signals, will set the flip-flop 252, as previously discussed. In addition, these two signals are logically gated by a NOR gate 256, the output of which is utilized as the source of load pulses for the n-bit shift registers 254 and 236. Thus, upon the setting of flip-flop 252, the n-bit storage register 254 is parallel loaded with the contents of the n-bit buffer 248, and the n-bit storage register 236 is parallel loaded with the contents of the n-bit storage register 254.

To parallel load the n-bit shift register 234 with the contents of the n-bit storage register 236, a determination must be made that the n-bits of information stored in the storage register 236 are of the correct type (e.g., data or control). For instance, assume that the two most recent signals placed on the communications loop are identification signals identifying a data character. Suppose however, the contents of the n-bit storage register 236 are associated with a control character. It would therefore be incorrect to follow these two data identifying signals with n-bits of control information signals. To insure that such a situation will not occur, the load pulse for the n-bit shift register 234 is only provided if there is a determination that the most recent identification portion of character inserted on the communications loop corresponds with the information signals stored in the storage register 236. If they do not correspond, the shift register 234 is cleared. To perform this function the Q output of the flip-flop 264 is provided as one input to a three-input NAND gate 258. A second input for the NAND gate 258 is from the output of the counter 240 which provides a control signal after having reached a count of $n + 2$ clock pulses. It is this same control signal which reset the counter 240 to ZERO. The third input to the NAND gate 258 is from the output of the flip-flop 252, which will indicate whether the information signals stored in the n-bit storage register 236 are of the data or control type. The output of the NAND gate 258 is connected to the load terminal of the n-bit shift register 234.

Thus, with the arrangement described above, a negative load pulse will only be provided to the n-bit shift register if the information signals stored in the storage register 236 are of the type which correspond with the most recent identification signal inserted on the communications loop. Also note from this arrangement that the clocks for inserting information onto the communications loop is completely independent of the clocks derived from information signals received from the communications loop. Therefore, the synchronizer can function independently of any time delay which may have been encountered by the character as it circulated around the communications loop.

A further observation should also be readily apparent from FIG. 1, and that is that the clocks for each communications loop can be independent. Thus an asynchronous system can be achieved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for use with a serial digital transmission loop having alternately characterized information signals including clock information comprising:
   a source of clock pulses;
   first means responsive to certain of said clock pulses from said source of clock pulses for forming identical information carrying slots to be transmitted by said serial loop;
   second means connected between one end of said serial loop and said first means for receiving said alternately characterized information signals from said serial transmission loop;
   third means connected between the other end of said serial transmission loop and said second means and responsive to said certain of said clock pulses and to certain other of said clock pulses from said source of clock pulses for formatting information signals in said formed information carrying slots for transmission by said serial transmission loop; and
   fourth means connected between said third means and said first means for characterizing said information signals in said formed information carrying slots responsive to said characterization of said received information signals.

2. The apparatus of claim 1 wherein said second means includes:
   means for deriving clock signals from said received characterized information signals;
   buffer means responsive to said derived clock signals for receiving serially said received characterized information signals;
   first storage means for receiving in parallel upon command the contents of said buffer means;
   second storage means for receiving in parallel upon command the contents of said first storage means; and
   means responsive to said characterization of said received characterized information signals for providing said command to said first and said second storage means and for providing the contents of said second storage means for said formed information carrying slots.

3. The apparatus of claim 1 further including counting means connected to said source of clock pulses for providing a first and a second control signal and wherein said fourth means includes a shift register, said shift register being partially parallel loaded with information signals provided by said second means in response to the occurrence of said first and said second control signals.

* * * * *